United States Patent [19]
Yamana

[11] Patent Number: 5,475,493
[45] Date of Patent: Dec. 12, 1995

[54] GRAY BALANCE CORRECTING METHOD

[75] Inventor: Keiichi Yamana, Kanagawa, Japan

[73] Assignee: Fuji Photo Film Co., Ltd., Kanagawa, Japan

[21] Appl. No.: 194,850

[22] Filed: Feb. 14, 1994

[30] Foreign Application Priority Data

Feb. 16, 1993 [JP] Japan .................... 5-027007
Feb. 16, 1993 [JP] Japan .................... 5-027008

[51] Int. Cl.$^6$ .................... G01J 3/50; G03B 27/73
[52] U.S. Cl. .................... 356/404; 355/77
[58] Field of Search .................... 358/455, 506; 356/404; 355/77

[56] References Cited

U.S. PATENT DOCUMENTS

| | | | |
|---|---|---|---|
| 4,547,811 | 10/1985 | Ochi et al. | 358/455 |
| 4,841,360 | 6/1989 | Birgmeir | 358/80 |
| 4,845,551 | 7/1989 | Matsumoto | 358/506 |
| 4,893,180 | 1/1990 | Shigaki et al. . | |
| 4,975,737 | 12/1990 | Murooka et al. . | |
| 5,053,888 | 10/1991 | Nomura | 358/455 |
| 5,121,195 | 6/1992 | Seki et al. | 355/455 |
| 5,321,524 | 6/1994 | Yanagita | 358/455 |

FOREIGN PATENT DOCUMENTS

| | | |
|---|---|---|
| 0363969 | 4/1990 | European Pat. Off. . |
| 0430165 | 6/1991 | European Pat. Off. . |
| 4010299 | 2/1991 | Germany . |

Primary Examiner—F. L. Evans
Attorney, Agent, or Firm—Sughrue, Mion, Zinn, Macpeak & Seas

[57] ABSTRACT

A gray balance correcting method in which the deterioration of color balance correcting capacity can be avoided for an image photographed under different kinds of light sources, such that the influence of failure can be eliminated. An image recorded on a negative film is divided into a large number of regions. Density values of C, M and Y in the respective regions are measured. Maximum and minimum reference values for the C, M and Y colors are calculated based on the measured density values D. Then, conversion correlation coefficients, for the respective colors, are calculated to make values, after conversion of the reference values of the respective colors, coincident with $D_{max}$ and coincident with $D_{min}$. The measured density values of C, M and Y are converted by using the conversion correlations determined from the calculated coefficients. In another embodiment, only maximum values are used as reference values. In yet another embodiment, the converted measured density values are plotted on color coordinates. Then, averages in a predetermined region S containing a line L passing through the maximum and minimum converted reference values, $D_{max}$ and $D_{min}$, are calculated based on the distribution plotted on the color coordinates. Conversion correlations of the respective colors are corrected according to curves of secondary degree $P_C$ and $P_Y$ passing through $D_{max}$, $D_{min}$ and the average of the density values. The C, M and Y measured values are then converted again by using the corrected conversion correlations.

7 Claims, 19 Drawing Sheets

BASE DENSITY
MEASUREMENT
REGION

□: M'-C'
○: M'-Y'

GRAY BALANCE CORRECTING METHOD

BACKGROUND OF THE INVENTION

The present invention relates to a gray balance correcting method for correcting the gray balance of an image recorded on a negative film.

An image recorded on a color negative film is pervious to three colors of light; namely, B (blue), G (green) and R (red). It is known, experimentally, that the transmission ratio of the three colors is generally, substantially equal or predetermined (Evans theory). Therefore, in most photographic printers, the exposure condition is determined on the basis of the following equation called an integral neutral method:

$$\log Ej = Kj + Aj \cdot Dj \qquad (1)$$

in which log Ej represents a logarithm of exposure, Kj represents a constant based on a photosensitive material, a photographic printer, etc., Dj represents an accumulated transmission density of the image (LATD), Aj represents a correction coefficient, and j represents a color (R, G or B) of light. According to the aforementioned equation (1), for example, the exposure of R is set large for an image with a small amount of transmitted light (high in the accumulated transmission density of R), so that the total amount of each of the R, G and B light radiated onto print paper, through a negative film, is made coincident with each other when printing on the print paper is based on the exposure calculated as described above. Accordingly, the accumulated density values of R, G and B in an image printed on the print paper are made constant so that the gray balance is maintained over the entire image.

In the case of a negative film, the densities of R, G and B, which develop Magenta (M), Yellow (Y) and Cyan (C), respectively, theoretically change with a constant difference in density, as shown in FIG. 1(A), when the amount of exposure changes at the time of photographing. In the aforementioned integral neutral method, when, for example, accumulated transmission densities are $M_0$, $Y_0$ and $C_0$, exposure is determined to make these coincident with each other. Accordingly, exposure can be determined, theoretically, to make the density change characteristics of the respective colors coincident with each other, so that gray balance ought to be maintained within a range between the minimum density and the maximum density in the printed image. The abscissa of FIG. 1 shows the exposure quantity in log scale.

In practice, however, the density change characteristics of the respective colors in the negative film are affected by processing conditions such as development, etc., so that the slopes of the curves of the density change characteristics are different, as shown in FIG. 1(B). In the case where the slopes of the curves for the density change characteristics for the respective colors are different, displacements in these curves occur in a region (for example, region A shown in FIG. 1(C)) in which the densities are higher than the predetermined values as compared with the accumulated transmission densities. Similar behavior results for a region (for example, region B shown in FIG. 1(C)) in which the densities are lower than the predetermined values. As a result, gray balance is not maintained, and the undesirable situation arises where the colors in the portions of the image that correspond to the aforementioned regions of the image printed on the print paper, are different from the colors of the subject at the time of photographing.

Density failure occurs in situations where the background portion of an image has an extremely high or low density level. In such situations the accumulated transmission density differs greatly from the density of the main subject portion of the image. This is called density failure. When the aforementioned image is printed on print paper, where the basis of exposure is determined by applying the aforementioned integral neutral method, the image is affected by the density failure so that the exposure of the main subject portion of the image becomes either short or excessive.

Color failure occurs in situations where the background portion of an image is wide and is comprised of a specific color, such as green grass, or blue sea, etc., and greatly differs from the color of the main subject. In such a situation the accumulated transmission density of the specific color is high. The result is that the color balance across the entire scene is greatly biassed against the color balance of the main subject. This is called color failure. When the aforementioned image is printed on print paper with the basis of exposure determined by applying the integral neutral method, the image is affected by the color failure so that the color balance of the main subject portion in the image is not maintained. This problem also occurs when the accumulated transmission density of equation (1) is replaced by the average density of the entire scene.

However, in a conventional printer, density failure and color failure are prevented by a so-called lowered correction, where an exposure correction value is lowered. However, in the lowered correction remedy, the color balance correction capacity is reduced with respect to an image photographed by a specific light source other than sun light (such as a fluorescent lamp, a tungsten lamp, etc.), so that an appropriate print result cannot be obtained.

Further, a method of determining exposure by calculating the accumulated transmission density (or average density) over an entire image while removing data from a portion of the image predicted to be highly saturated (see Japanese Patent Postexamination Publication No. Sho-59-29847); a method of determining exposure after converting high-saturation measured light data into achromatic color (see Japanese Patent Unexamined Publication No. Sho-59-29847); and so on, have been proposed. It is however difficult in practice, to judge accurately whether the image is a high-saturation image or whether the image is an image photographed by a specific light source. Furthermore, these methods are problematic in that they involve complicated procedures.

Given these problems, an object of the present invention is to provide a gray balance correcting method in which the color balance correction capacity, with respect to an image photographed by a specific light source, is prevented from being reduced and in which the influence of failure can be eliminated.

SUMMARY OF THE INVENTION

To achieve the foregoing object, the gray balance correcting method according to the invention comprises the steps of: dividing an image recorded on a negative film into a large number of regions and measuring the density values of the three colors corresponding to pigment density of the film for each region; determining maximum reference values for the respective colors on the basis of the measured density values; obtaining conversion correlations such that the converted maximum reference values of the respective colors are coincident with each other; and converting the measured density values of the three colors by using the thus obtained conversion correlations to thereby correct the gray balance.

The conversion correlations may be determined so that the converted maximum reference values of the respective colors are made coincident with the average of the maximum measured values of the three colors.

The gray balance correcting method according to a second aspect of the invention comprises the steps of: dividing an image recorded on a negative film into a large number of regions and measuring the density values of the three colors corresponding to pigment density of the film for each region; determining maximum reference values and minimum reference values for the respective colors on the basis of the measured density values; obtaining conversion correlations such that the converted maximum reference values of the respective colors are coincident with each other and such that the converted minimum reference values of the respective colors are coincident with each other; and converting the measured density values of the three colors by using the thus obtained conversion correlations to thereby correct the gray balance.

The conversion correlations, in the second aspect of the invention, may be determined so that the converted maximum reference values of the respective colors are made coincident with the average of the maximum measured density values of the three colors and that the converted minimum reference values of the respective colors are made coincident with the average of the minimum measured density values of the three colors.

The gray balance correcting method according to a third aspect of the present invention comprises the steps of: dividing an image recorded on a negative film into a large number of regions and measuring the density values of the three colors corresponding to pigment density of the film for each region; calculating maximum reference values and minimum reference values for the respective colors on the basis of the measured density values; determining conversion correlation such that the converted maximum reference values of the respective colors are coincident with each other and such that the converted minimum reference values thereof are coincident with each other; converting the measured density values of the three colors by using the determined conversion correlation; calculating the average density data in a predetermined region containing a line passing through the converted maximum reference value and the converted minimum value, on the basis of the distribution, on color coordinates, of density data obtained by conversion; correcting the conversion correlation of the respective colors in accordance with a curve passing through the converted maximum density value, the converted minimum value, and the average; and performing conversion again by using the corrected conversion correlation to correct the gray balance.

It is preferable that the division of the image is performed so that the area of each of the regions on the film is set to be less than or equal to 200 μm².

In most photographs, a white or near white portion is contained in a subject of the photograph. This is because a reflected portion of the light source looks white except for the case where the color of the subject is simply white. White is the brightest color, so that a region corresponding to the white or near white portion of the subject, in an image formed on a negative film, has the highest three-color density values in the image. In the case where a photograph is taken with a specific light source, the color of the white or near white portion is affected by the color of light from the light source, so that the color is slightly shifted from white. For example, when a fluorescent lamp is used as a light source, a green component is added, on the whole, to the white portion of the subject. Thus, a slight magenta component is added to the color of the predetermined region in the image of the negative film that corresponds to the portion of the subject from which the light is reflected. It is highly probable that this predetermined region is the portion of the image having the highest three-color density values.

In the first aspect of the invention, an image recorded on a negative film is divided into a large number of regions. Density values of the three colors corresponding to the pigment density of the film are measured for the respective regions, and maximum reference values for the respective colors are determined based on the measured density values. For example, the maximum of the measured values for the respective colors may be used directly as the maximum reference values, or in order to reduce the influence of dust attached on the film, scratches on the film, or the like, a weighted average may be used as the approximate maximum reference values. To determine the weighted averages, as will be described with respect to an embodiment of the invention, the image is divided into the predetermined number of sections and the maximum values of the measured values are obtained for each section. Once the maximum values are obtained, the weighted average of the maximum values is calculated for each section by applying a predetermined weight to each section. These weighted averages may then be used as the reference value which approximates the maximum value.

Alternative approximations of the maximum value may be used, such as an average, or the like, of a specified number of measured values of upper rank in descending order; a value of specified precedence of the measured values approximate to the maximum value; or an average of the measured values in a predetermined range of precedence values.

Then, conversion correlations are obtained so as to convert the maximum reference values, for each of the respective colors, so that they are coincident with each other. The measured values for the three colors are converted by using the conversion correlations. This is equivalent to correction of the gray balance based on the maximum reference values of the respective colors which correspond to a white or near white portion of the image, where the color of a region corresponding to the white or near white portion of the subject is corrected to be made white. Accordingly, not only the white portion of the subject in an image photographed under sun light is corrected to be made white, but the white portion containing, for example, the green component in an image photographed by using a fluorescent lamp as a light source is corrected to be made white. That is, the white portion is corrected so that gray balance is maintained.

Even in the case where the background portion of the image has a large area and is different in density or color from the main subject, the magnitude of the maximum reference value is not affected so that the reference values do not vary. Accordingly, even in the case of an image in which density failure or color failure occurs, density data is obtained which is not influenced by such failures. It is statistically known that even in the case of an image obtained by photographing a subject having no white or near white portion, the maximum density values of the respective colors in the image are made substantially equal to the density values in the white or near white portion. Accordingly, if correction is carried out on the basis Of the maximum reference value, color balance can be corrected so as to be appropriate even in the case of an image obtained by photographing the aforementioned subject.

In a second aspect of the invention, an image recorded on a negative film is divided into many regions and density values for the three colors are measured for the respective regions. Maximum reference values and minimum reference values for the respective colors are determined on the basis of the measured density values. With respect to the minimum reference values, for example, the minimum of the measured values for each of the respective colors may be used directly, or after the image is divided into a predetermined number of sections and the minimum density values are obtained for the respective sections. Once the minimum density values are obtained, the weighted average of the minimum density values is calculated by applying weights preliminarily set for the respective sections. The weighted average may be used as the minimum reference value.

Alternative approximations of the minimum value may be used, such as: an average, or the like, of the specified number of measured values of lower rank in descending order; the value of specified precedence of the measured values approximate to the minimum value; or an average of the measured values in a predetermined range of precedence values. Alternatively, the base density of the negative film may be used.

Then, conversion correlations are obtained so as to convert the maximum reference values, for each respective color, so that they are coincident with each other, and so as to convert the minimum reference values, for each respective color, so that they are coincident with each other. The measured values, for each color, are converted by using the conversion correlations. This is equivalent to correction of color balance by making the maximum reference values of the respective colors correspond to white and the minimum values of the respective colors correspond to black, and coincident at two points. That is, color balance is corrected so that the color of a region corresponding to a white or near white portion of the subject is made white, and that the color of a region corresponding to a black or near black portion contained in the subject is made black, in most cases.

As described above, correction is carried out to make the maximum reference values of the respective colors coincident with each other and to make the minimum reference values of the respective colors coincident with each other. That is, to make the density change characteristics as shown in the FIG. 2(A) coincident at two points, $D_{max}$ and $D_{min}$, as shown in FIG. 2(B).

Compared with the conventional case, where correction is carried out to make accumulated transmission density values coincident by referring to accumulated transmission density (one point), displacements in the density change characteristics of the respective colors are reduced so that the probability that appropriate color balance is obtained in the case of intermediate density, between the maximum and the minimum, becomes very high. Accordingly, appropriate color balance can be obtained in all regions regardless of the respective densities of the large number of regions.

Psychologically, a human being judges the lightest portion in a field of view to be white and the darkest portion in a field of view to be black. Accordingly, when a portion to be white is colored in a photographic print, that portion is very prominent. On the contrary, because correction is carried out in the present invention by referring the maximum reference values (white) and the minimum reference values (black), the black and white portions of the subject are accurately printed as white and black. Accordingly, compared with the conventional method, the method of the present invention is a correcting method highly adapted to the psychological perceptions of a human being.

As in the first aspect of the invention, the correction described in the second aspect of the invention can be performed to obtain appropriate color balance where an image is photographed under different light sources and the influence of density,failure or color failure can be eliminated.

In the situation where an image is formed in which the color of a light source in the maximum density portion of the image is different from the color of a light source in an intermediate density portion of the image, a problem arises in that the gray balance is not maintained in the intermediate density portion of the image. This can occur even though the gray balance is corrected to make the maximum and minimum reference values coincident at two points. For example, where an image is photographed using a strobe light against the sun light, the colors of the light sources are different from each other, and the sun light and the strobe light are the light sources for the maximum and the intermediate density portions of the image, respectively.

In the aforementioned correction method for the first aspect of the invention, gray balance is corrected by referring to the maximum density portion of the subject, that is, by referring to the white or near white portion of the image in which sun light is reflected. Occasionally, gray balance is not maintained in the intermediate density portion of the image when a strobe light is used as a light source. As shown in FIG. 2(A), the density change characteristics of the respective colors in the negative film are not linear. Accordingly, slight displacement of the gray balance occurs when correction is performed by simply making the maximum reference density and minimum reference density values coincident, as shown in FIG. 2(B).

In a third aspect of the present invention, therefore, the average of the density data, in a predetermined region, which contains a line passing through the converted maximum reference value and the converted minimum reference value, is calculated based on the distribution, plotted on color coordinates, of the converted density data. Conversion correlations for the respective colors are corrected in accordance with a curve passing through the converted maximum density value, the converted minimum reference value, and the average, as shown in FIG. 19(C). Conversion is again performed by using the corrected conversion correlations to thereby correct the gray balance. Generally, density data is distributed on or near a line passing through the converted maximum reference value and the converted minimum reference value. However, in the case of an image in which color failure has occurred, the density data distribution can be spread far from the line. This distribution pattern corresponds to a high-saturation portion of the image. Thus, the distribution can be used to determine that the pattern corresponds to the background portion of the image.

Accordingly, the average of the density data in the predetermined region corresponds to the gray balance of the portion of intermediate density between the converted maximum reference value and the converted minimum value, after the influence of color failure or the like is eliminated. The curve passing through the converted maximum reference value, the converted minimum value and the average is an indication expressing appropriate balance between conversion correlations of the respective colors. Thus, if the conversion correlations of the respective colors are corrected in accordance with the curve, and conversion is performed again by using the corrected conversion correlations, correction is performed to make the color of the intermediate density portion gray. The gray balance is then maintained between the maximum density value and the minimum density value, even in the case of an image in which the color of the light source associated with the maximum density portion of the image is different from the color of the light source associated with the intermediate density portion of the image.

As described above, in the present invention the influence of color failure can be eliminated without reduction of the color balance correction capacity in the case of an image photographed by a plurality of light sources.

Division of the image is preferably carried out so that the area of each of regions on the negative film is less than or equal to 200 µm². In the case where the maximum reference value (or the minimum reference value) is determined by dividing the image into a plurality of regions and measuring density values in each of the respective regions, the size of the maximum (or minimum) density value exerting an influence on the size of the maximum reference value (or the minimum reference value) varies in accordance with the size of each region obtained by division. That is, when the size of the regions obtained by division is selected to be large, measured density values may be estimated to be smaller so that the maximum value cannot be accurately obtained, since the density of a region having a high density in a small area is also subjected to averaging. This problem may also arise for regions having a low density in a small area.

Making the area of each region very small solves this problem, however by doing so greatly increases the quantity of data and, hence, the processing time. The processing time, however, should not be allowed to become unduly large. The present inventors have found, experimentally, by varying the region size, that a region size selected to be 200 µm² results in reference values equal to about 90% of the reference values obtained when very small region sizes are used. Accordingly, when the area of each region obtained by division is selected to be larger than 200 µm² (but preferably not too small considering the processing time effect), maximum and minimum reference values with small errors can be obtained.

DETAILED DESCRIPTION OF THE PREFERRED EMBODIMENTS

Several embodiments of the present invention will be described below in detail with reference to the drawings.

Figure 1A:
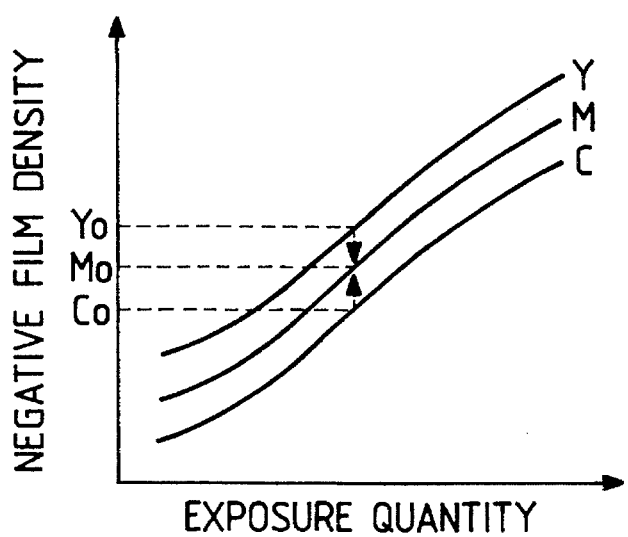
FIG. 1 shows a series of graphs for explaining conventional problems; diagram (A) is a graph showing ideal density change characteristics of the respective colors of a negative image; diagram (B) is a graph showing real density change characteristics; and diagram (C) is a graph showing density change characteristics corrected to make accumulated transmission densities coincident.
Figure 1B:
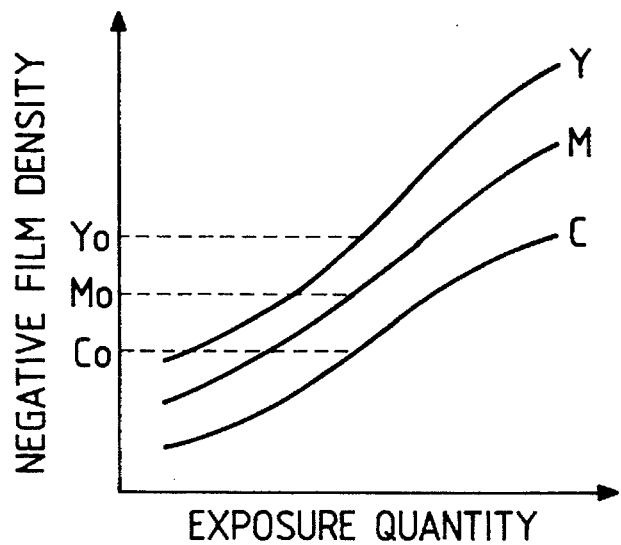
Figure 1C:
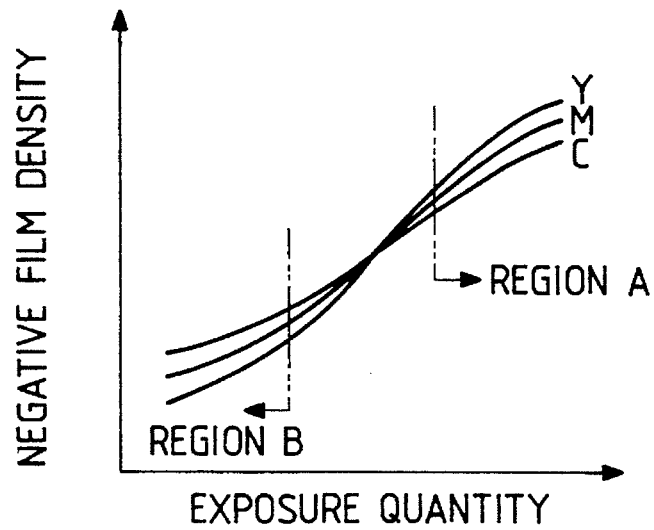
Figure 2A:
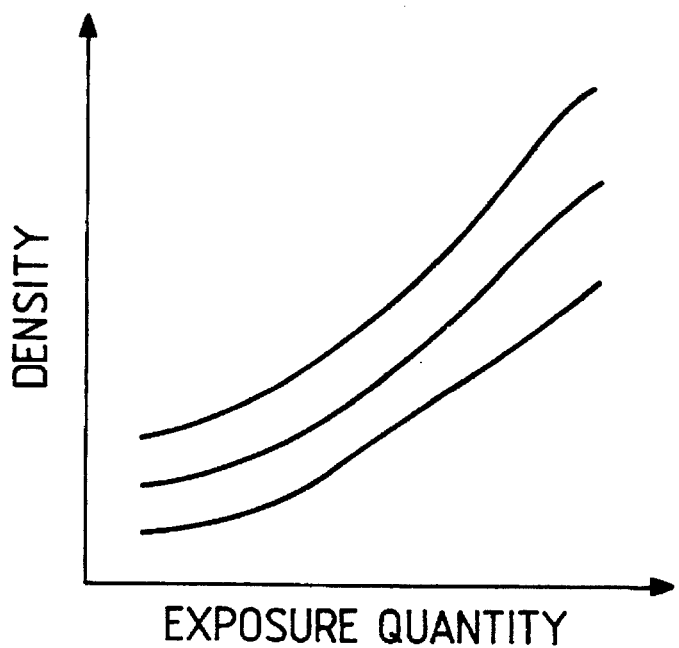
FIG. 2 shows the operation of the present invention; 2(A) is a graph showing density change characteristics of the respective colors before correction; 2(B) is a graph showing density change characteristics which are corrected based on the maximum and minimum reference values.
Figure 2B:
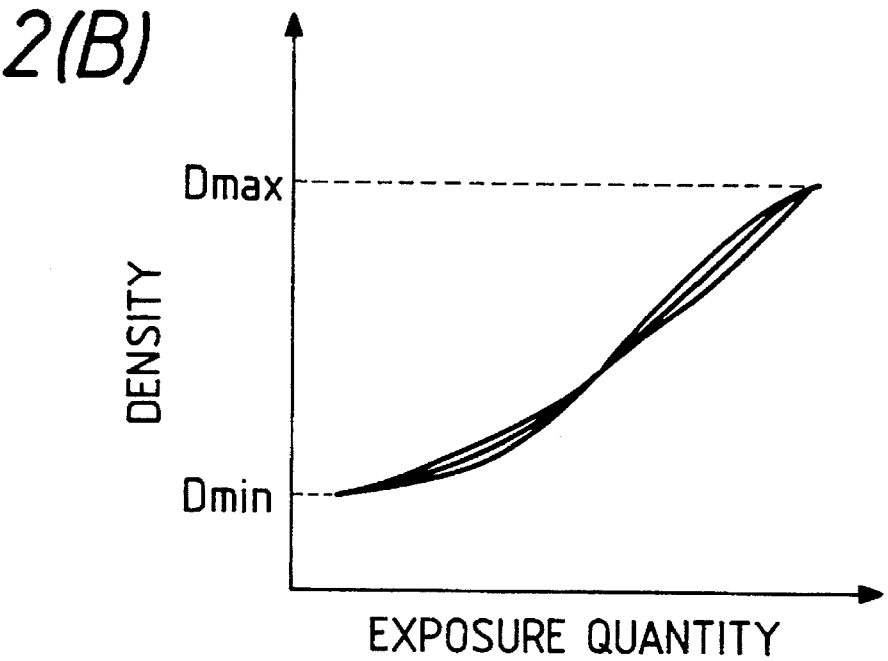
Figure 3:
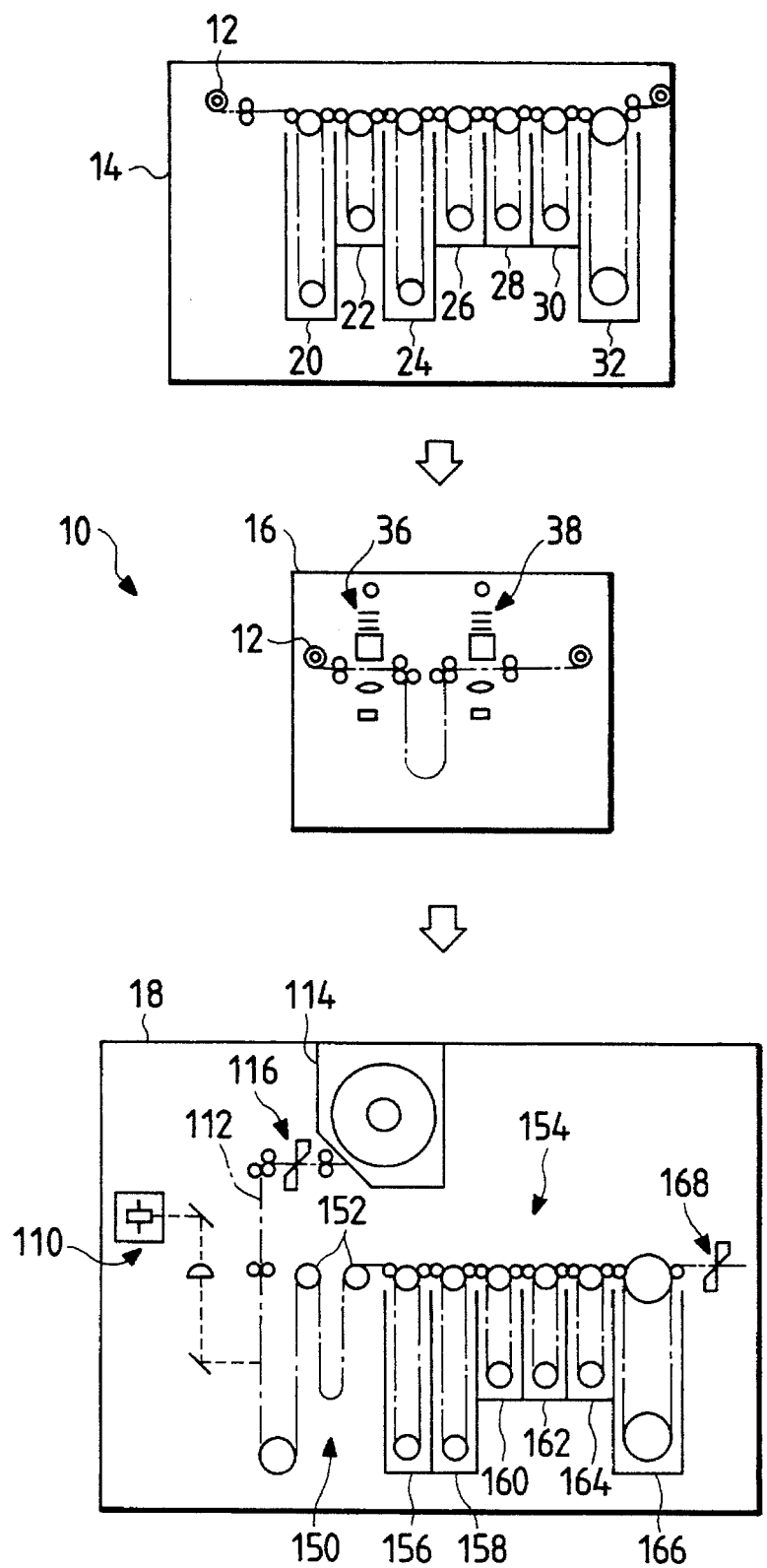
FIG. 3 is a schematic diagram of a photographic processing system according to the present invention.

A first embodiment relates to a photographic processing system 10 as shown in FIG. 3. A large number of negative films 12 are brought into the photographic processing system 10. On each negative film are a predetermined number of images that have been taken by a camera, which is not shown. The negative films 12 are spliced together by means of splicing tapes, or the like, and rolled so as to be stratified. Then, the roll of negative film is set in a film processor of the photographic processing system 10.

The film processor has a color development tank 20, a bleach tank 22, a bleach-fixing tank 24, water washing tanks 26 and 28 and a stabilization tank 30 which are arranged in order within the film processor. These treating tanks each hold predetermined treating solutions. The negative film 12 set in the film processor is successively fed through each of the respective treating tanks and immersed in the respective treating solutions so that the negative film 12 is subjected to the treatments of color development, bleaching, bleaching-fixing, water washing and stabilization. As a result, negative images, which are recorded as latent images on the negative film 12, are made visible.

Further, a drying portion 32 is disposed in the downstream side of the stabilization tank 30, and has a fan and a heater, which are not shown. An air stream produced by the fan is heated by the heater to form a hot stream of air. The hot air stream is blown across the negative film 12 so that water deposited on a surface of the negative film 12 is removed by drying. The negative film 12 thus processed by the film processor is rolled so as to be stratified and then set in a film image reader 16.

Figure 4:
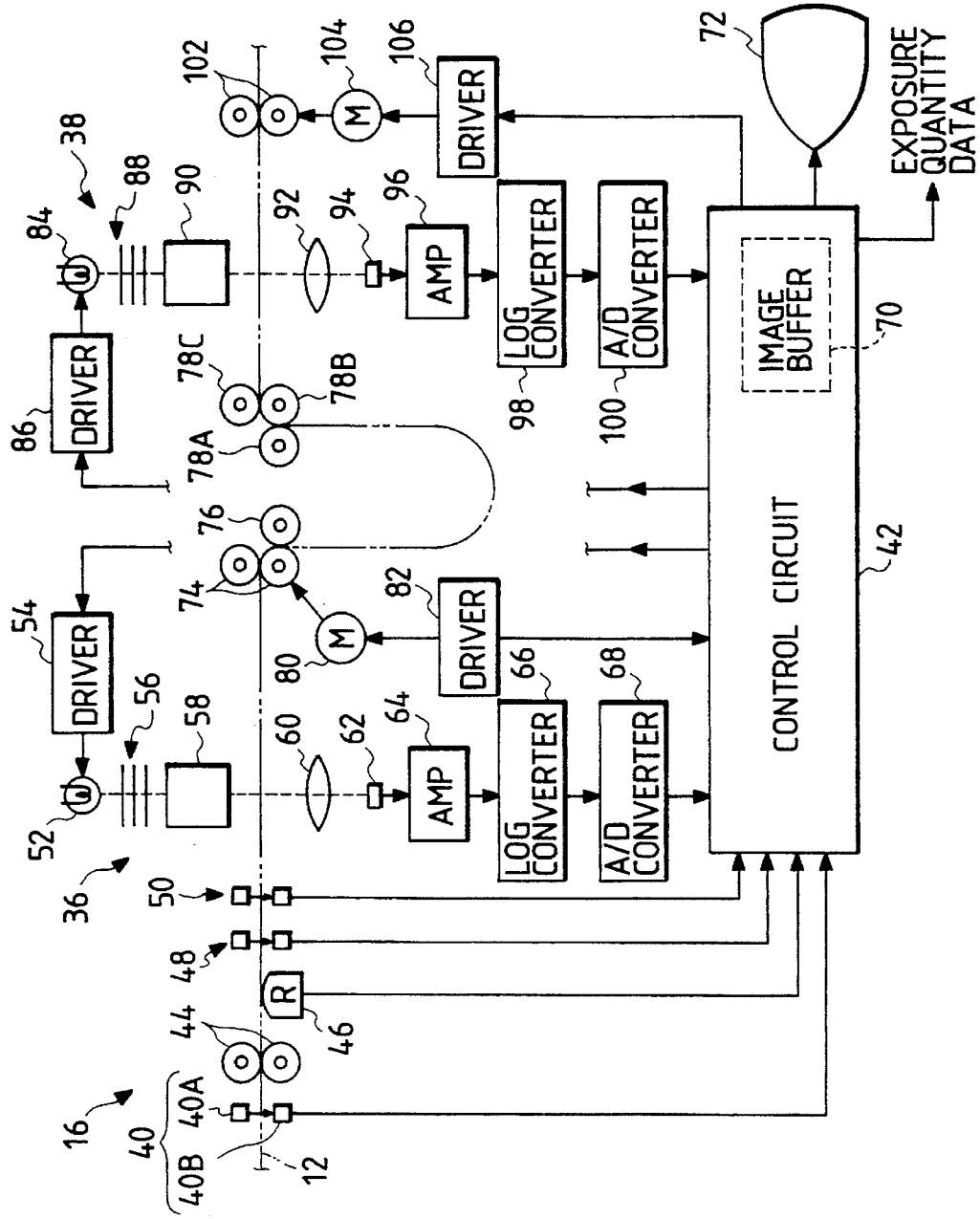
FIG. 4 is a schematic diagram of a film image reader.

As shown in FIG. 4, the film image reader 16 contains a pre-scan portion 36 and a fine-scan portion 38 which are arranged in order, along a film conveyance path. In the respective scan portions 36 and 38, images recorded on the negative film 12 are scan-read, which is described below. An insertion detection sensor 40 is provided in the upstream side of the film conveyance path. The insertion detection sensor 40 consists of a light-emitting element 40A and a photo-detecting element 40B which form a pair and are arranged so as to be opposite to each other with respect to the film conveyance path. The photo-detecting element 40B is connected to a control circuit 42. The control circuit 42 determines whether or not the negative film 12 has been inserted in the film conveyance path, on the basis of a change in the level of the signal output from the photo-detecting element 40B.

Located between the insertion detection sensor 40 and the pre-scan portion 36, are, in the order they are arranged, a pair of rollers 44 for conveying the negative film 12 while nipping the negative film 12, a read head 46, a frame number detection sensor 48 and a picture detection sensor 50. The read head 46, the frame number detection sensor 48 and the picture detection sensor 50 are connected to the control circuit 42. In certain cases, a negative film 12 may have information, such as frame number, film type, DX code, etc., magnetically recorded on a magnetic layer. Such a magnetic layer being formed by applying a transparent magnetic material onto the rear surface of the negative film 12. The read head 46 is arranged in a position in which the information magnetically recorded on the aforementioned magnetic layer can be read. The read head 46 reads the information and sends it to the control circuit 42.

The frame number detection sensor 48 and the picture detection sensor 50 each consist of a light-emitting element and a photo-detecting element, which form a pair in the same manner as for the insertion detection sensor 40. The negative film 12, may have information, such as frame number, etc., recorded optically (for example, by means of bar code or the like) on the film. The frame number sensor 48 is arranged such a position that the optically recorded information can be detected. The frame number sensor 48 detects the recorded information such as frame number, etc., and feeds it to the control circuit 42.

The picture detection sensor 50 is positioned in the center of the width of the negative film 12. A non-image portion of the negative film, between the images recorded on the negative film, allows a large quantity of light to be transmitted through negative film, compared with the above-described image recording portion of the film, since the density of the non-image portion is merely the density of the base of the negative film. The control circuit 42 monitors the level of the signal generated from the photo-detecting element of the picture detection sensor 50. When the level of the signal increases to a predetermined level corresponding to the base density of the film, and when the level of the signal decreases from the level corresponding to the base density, the control circuit 42 determines that an edge of an image that is recorded on the negative film, is under the picture sensor 50. The position (and size) of the image recorded on the negative film 12 can be determined based on the timing of edge detection.

On the other hand, the pre-scan portion 36 has a lamp 52 which is arranged to emit light toward the negative film 12 passing through the pre-scan portion 36. The lamp 52 is connected to the control circuit 42 through a driver 54. The level of the voltage supplied from the driver 54 is controlled by the control circuit 42 to emit a predetermined quantity of light. A CC filter set 56 consisting of three CC filters, that is, C (cyan), M (magenta) and Y (yellow), and a light diffusion box 58 are arranged, in that order, on the light-emitting side of the lamp 52 and on one side of the film conveyance path. An image-forming lens 60 and a CCD line sensor 62 are arranged, in that order, on the other side of the film conveyance path.

The respective CC filters of the CC filter set 56, are inserted into the light path and preliminarily adjusted in order to compensate for the variation in the CCD line sensor's 62 sensitivity to the three colors of R, G and B. Light successively transmitted through the CC filter set 56, the light diffusion box 58, the negative film 12 and the image-forming lens 60 impinges upon a photo-detecting surface of the CCD line sensor 62. The CCD line sensor 62 consists of a large number of sensor units spaced at intervals of a predetermined pitch, in the direction of the width of the negative film 12. Each of the sensor units is formed by arranging adjacent sensors for detecting the quantity of R light, sensors for detecting the quantity of G light and sensors for detecting the quantity of B light.

Accordingly, the CCD line sensor 62 divides an image into a large number of pixels each having the above-mentioned sensor unit pitch as the size of one side, and it detects the quantity of transmitted light for each pixel. The area of each pixel corresponds to an area smaller than 200 μm. The image-forming lens 60 forms an image on the photo-detecting surface of the CCD line sensor 62 by converging light which is transmitted through the negative film 12 and transmitted through one pixel line (hereinafter the position of the pixel line being called "read position") crossing the optical axis of light emitted from the lamp 52 and arranged along the direction of the width of the negative film 12.

An amplifier 64, a LOG converter 66 and an A/D converter 68 are successively connected to the output of the CCD line sensor 62. A signal generated from the CCD line sensor 62 is amplified by the amplifier 64, converted logarithmically (into a level corresponding to the density value) by the LOG converter 66, and converted into digital data having a value corresponding to the signal level by the A/D converter 68. The A/D converter 68 is connected to the control circuit 42, so that the converted digital data is input to the control circuit 42 as density value data. The control circuit 42 has an image buffer 70 capable of storing density data for several images, and the input density value data is stored in the image buffer 70. Further, a CRT display 72 is connected to the control circuit 42, so that a positive image is exhibited on the display 72 by processing the information using the input density value data.

Further, between the pre-scan portion 36 and the fine-scan portion 38, a roller set consisting of a pair of conveyance rollers 74 and a follower roller 76, and another roller set consisting of follower rollers 78A, 78B and 78C, are arranged at predetermined intervals. A loop for the negative film 12 is formed between the two roller sets. Differences between the speed of conveyance of the negative film 12 in the pre-scan portion 36 and the speed of conveyance of the negative film 12 in the fine-scan portion 38 are absorbed by the loop. A pulse motor 80 is connected to the conveyance roller pair 74. The pulse motor 80 is connected to the control circuit 42 through a driver 82. The control circuit 42 causes the driver 82 to drive the pulse motor 80 to thereby convey the negative film 12.

The fine-scan portion 38 has substantially the same structure as the pre-scan portion 36. That is, the fine-scan portion 38 has a lamp 84 for emitting light toward the negative film 12. The lamp 84 is connected to the control circuit 42 through a driver 86. The level of the voltage supplied from the driver 86 is controlled by the control circuit 42 so that a predetermined quantity of light is emitted. A CC filter set 88 consisting of three CC filters and a light diffusion box 90 are arranged in that order on the light-emitting side of the lamp 84, and on one side of the film conveyance path. An image-forming lens 92 and a CCD line sensor 94 are arranged in order on the other side of the film conveyance path.

Also, the respective CC filters of the CC filter set 88, are inserted into the light path by an amount and preliminarily adjusted in order to compensate for the CCD line sensor's 94 variation in sensitivity to the three colors of R, G and B. The image-forming lens 92 forms an image on the photo-detecting surface of the CCD line sensor 94 by converging light which is transmitted through the CC filter set 88, the light diffusion box 90 and the negative film 12 and transmitted through one pixel line located in the read position. The CCD line sensor 94 has the same structure as the CCD line sensor 62 except that the sensor unit pitch of the CCD line sensor 94 is smaller than that of the CCD line sensor 62. Accordingly, compared with the CCD sensor 62, the CCD line sensor 94 divides an image into a larger number of pixels and detects the quantity of transmitted light for each pixel.

An amplifier 96, a LOG converter 98 and an A/D converter 100 are successively connected to the output of the CCD line sensor 94. A signal generated from the CCD line sensor 94 is amplified by the amplifier 96, converted into a level corresponding to the density value by the LOG converter 98 and converted into digital data by the A/D converter 100. The A/D converter 100 is connected to the control circuit 42, so that the converted digital data is input as density value data to the control circuit 42.

The input density value data is stored in an image buffer 70 in the same manner as described above. The control circuit 42 calculates exposure values for R, G and B colors on print paper, on the basis of the density value data. The control circuit 42 is further connected to a printer portion 110 of a printer processor 18 which will be described later, so that the calculated data, which expresses exposure values, are transferred to a control circuit 122. A pair of conveyance rollers 102 are arranged on the downstream side of the fine-scan portion 38. Also a pulse motor 104 is connected to the conveyance roller pair 102. The pulse motor 104 is connected to the control circuit 42 through a driver 106. The control circuit 42 causes the driver 106 to drive the pulse motor 104 to thereby convey the negative film 12.

A magazine 114 for accommodating print paper 112 which is rolled so as to be stratified is set in the printer processor 18. The print paper 112 is drawn out of the magazine 114 and fed to the printer portion 110 through a cutter portion 116. When the exposure value data from the film image reader's control circuit 42 is transferred to the printer portion 110, the printer portion 110 exposes the image onto the print paper 112 based on the exposure value data.

Figure 5:
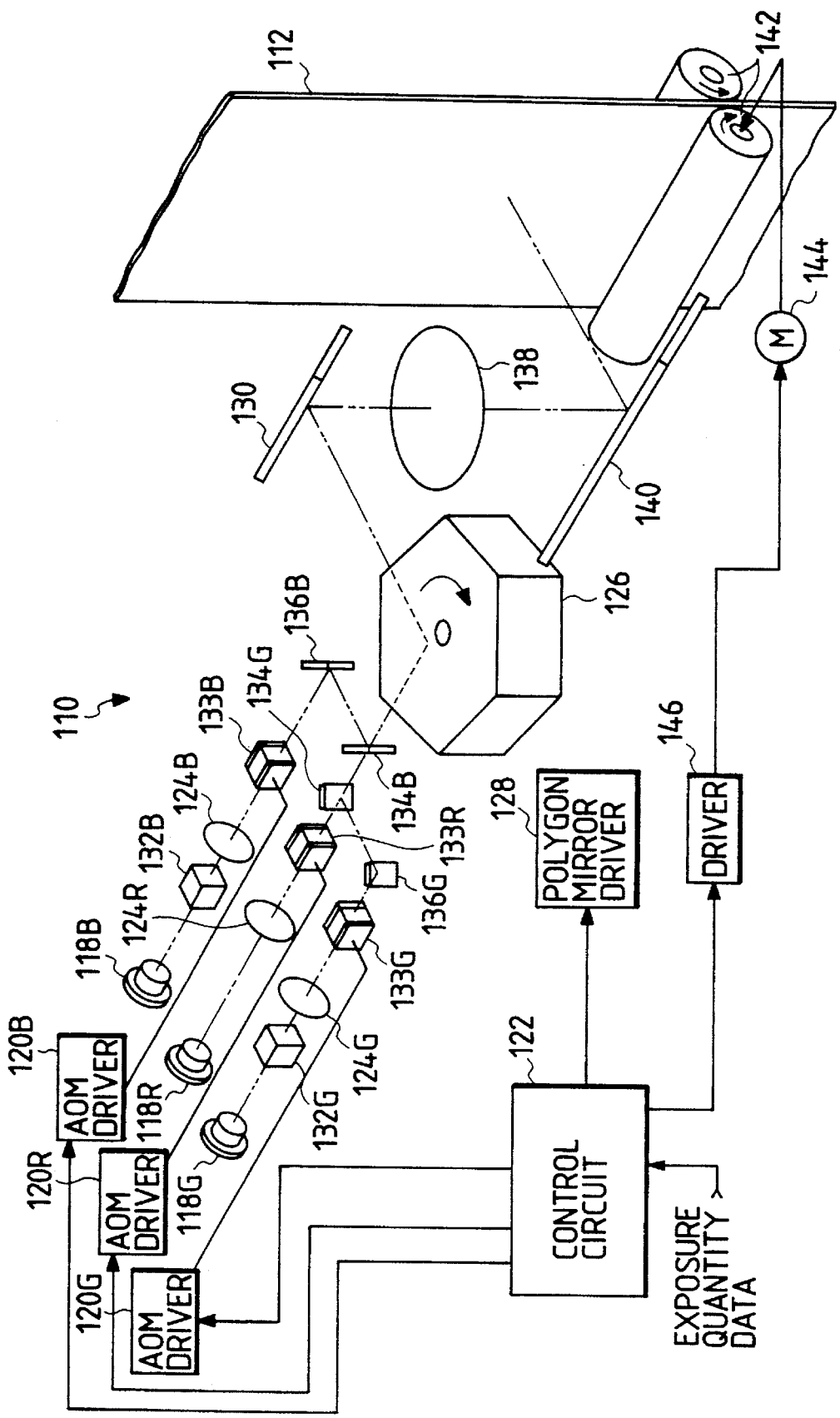
FIG. 5 is a perspective view showing the schematic structure of a printer portion.

As shown in FIG. 5, the printer portion 110 has a semiconductor laser 118R for emitting a laser beam with the wavelength of R. A collimator lens 124R, an acoustic-optic element (AOM) 133R, a dichroic mirror 134G for selectively reflecting light of G wavelength, a dichroic mirror 134B for reflecting light of B wavelength selectively and a polygon mirror 126 are arranged in order on the beam emitting side of the semiconductor laser 118R.

The AOM 133 is provided with an acoustic-optic medium. A transducer which outputs an ultrasonic wave in accordance with an input high-frequency signal and a sound absorber for absorbing ultrasonic waves transmitted through the acoustic-optic medium, are attached to a surface opposite to the acoustic-optic element. The AOM transducer 133R is connected to an AOM driver 120R. Upon reception of a high-frequency signal from the AOM driver 120R, the transducer diffracts a selected one of the incident laser beams, and emits the selected laser beam as a recording laser beam. The recording laser beam impinges on the polygon mirror 126 through the dichroic mirrors 134G and 134B.

Figure 6:
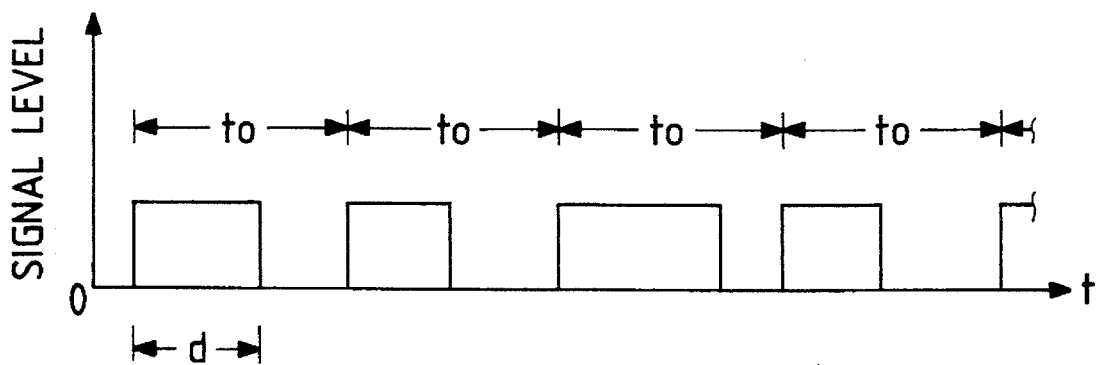
FIG. 6 is a graph showing the waveform of an exposure control signal delivered to an AOM driver.

The AOM driver 120R is connected to a control circuit 122. An exposure control signal corresponding to the R exposure value data is output from the control circuit 122 to the AOM driver 120R. The exposure control signal is a pulse signal with a period $t_0$ as shown in FIG. 6. The pulse width d is changed in accordance with the exposure value for each pixel on the basis of the R exposure value data. When the level of the input exposure control signal is high, the AOM driver 120R outputs a high-frequency signal to the AOM 133R so that a recording laser beam is emitted from the AOM 133R. Accordingly, the quantity of light emitted from the R wavelength laser beam and radiated onto the print paper 112 at intervals of period $t_0$, is changed on the basis of the R exposure value data.

Further, the printer portion 110 has semiconductor lasers 118G and 118B for emitting laser beams of predetermined wavelengths, respectively. A wavelength conversion element 124G, a collimator lens 124G, an AOM 133G and a total reflection mirror 136G are arranged in order on the beam emitting side of the semiconductor laser 118G. The AOM 133G is connected to the control circuit 122 through an AOM driver 120G. The control circuit 122 outputs an exposure control signal corresponding to the G exposure value data to the AOM driver 120G. When the level of exposure control signal is high, the AOM driver 120G outputs a high-frequency signal in the same manner as the AOM driver 120R.

Accordingly, the laser beam emitted from the semiconductor laser 118G is converted into a G wavelength beam by the wavelength conversion element 124G, so that the G wavelength beam impinges on the AOM 133G. When a high-frequency signal from the AOM driver 120G is input to the AOM 133G, a recording laser beam is emitted from the AOM 133G, reflected on the total reflection mirror 136G, reflected on the dichroic mirror 134G and mixed with the laser beam emitted from the semiconductor laser 118R.

Similarly, a wavelength conversion element 124B, a collimator lens 124B, an AOM 133B and a total reflection mirror 136B are arranged in order on the beam emitting side of the semiconductor laser 118B. The AOM 133B is connected to the control circuit 122 through an AOM driver 120B. The control circuit 122 outputs an exposure control signal corresponding to the B exposure value data, to the AOM driver 120B. The laser beam emitted from the semiconductor laser 118B is converted into a B wavelength beam by the wavelength conversion element 124B, so that the B wavelength beam impinges on the AOM 133B. When a high-frequency signal from the AOM driver 120G is input to the AOM 133G, a recording laser beam emitted from the AOM 133B is reflected on the total reflection mirror 136B and reflected on the dichroic mirror 134B so that the laser beam emitted from the semiconductor laser 118R and the laser beam emitted from the semiconductor laser 118G are mixed.

The laser beam, thus mixed through the dichroic mirrors 134G and 134B, impinges on the polygon mirror 126. The polygon mirror 126, which is connected to the control circuit 122 through a polygon mirror driver 128, rotates under control of the polygon mirror driver 128 which controls the rotational speed of the mirror. The exit direction of the laser beam incident on the polygon mirror 126 is successively changed by the rotation of the polygon mirror 126, so that scanning is performed along the horizontal direction as shown in FIG. 5. A mirror 130 is disposed on the laser beam exit side of the polygon mirror 126. The laser beam reflected on the polygon mirror 126 is reflected down by the mirror 130, as shown in FIG. 5.

A scanning lens 138 and a mirror 140 are arranged in order on the laser beam exit side of the mirror 130. The laser beam reflected on the mirror 130 is transmitted through the scanning lens 138 and reflected on the mirror 140. Because the print paper 112 is disposed on the laser beam exit side of the mirror 140, so that the direction of the length of the paper is coincident with the vertical direction of FIG. 5, the laser beam reflected on the mirror 140 is radiated onto the print paper 112. Further, a pair of conveyance rollers 142 for conveying the print paper 112 while nipping the print paper 112, are disposed below the laser beam radiation position of the print paper 112 conveyance path. The pair of conveyance rollers 142 are connected to a pulse motor 144. The pulse motor 144 is connected to the control circuit 122 through a driver 146. The control circuit 122 controls the driver 146 which drives the pulse motor 144 which conveys the print paper 112 downward, as shown in FIG. 5.

As shown in FIG. 3, the print paper 112 which has passed through the printer portion 110 is fed to a reservoir portion 150. In the reservoir portion 150, a pair of rollers 152 are provided at a predetermined interval so that the print paper 112 forms a loop between the pair of rollers 152. The difference between the conveyance speed in the printer portion 110 and the conveyance speed in a processor portion 154 is absorbed by this loop. A color development tank 156, a bleach-fixing tank 158 and water washing tanks 160, 162 and 164 are arranged in order in the processor portion 154. These treating tanks hold predetermined solutions. The print paper 112 is fed to the treating tanks successively such that the print paper 112 is successively immersed in the treating solutions so as to be treated.

A drying portion 166 is provided on the downstream side of the processor portion 154. The drying portion 166 supplies the print paper 112 with a hot air-stream produced by a fan and a heater, which are not shown. As a result, water deposited on a surface of the print paper 112 is removed by drying. The print paper 112, which has passed through the drying portion 166, is cut into print units by a cutter portion 168, and then ejected out of the printer processor 18.

The operation of the first embodiment is described below. A negative film 12 set in the film processor is fed to the respective treating tanks and then fed to the drying portion 32, so that the negative film 12 is subjected to the treatments of color development, bleaching, bleach-fixing, water washing, stabilization and drying. As a result, latent images recorded by a camera, are made visible. The negative film 12 processed by the film processor is set in the film image reader 16.

Figure 8:
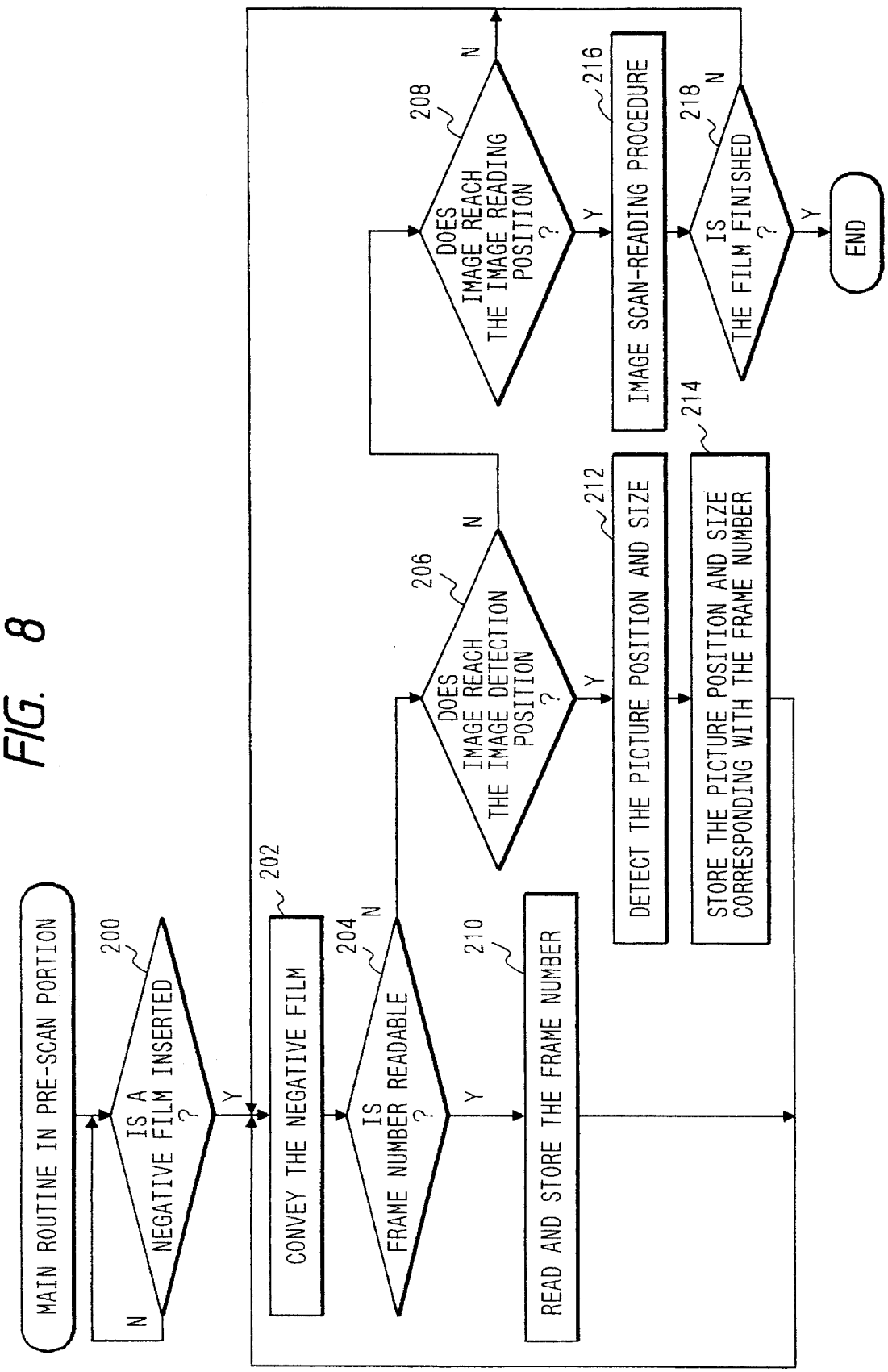
FIG. 8 is a flow chart showing the main routine in a pre-scan portion of the film image reader.

The operation of the pre-scan portion 36 in the film image reader 16 will be described below with reference to flow charts shown in FIGS. 8 and 9. In step 200, a decision is made on the basis of a signal from the insertion detection sensor 40, as to whether or not the negative film 12 has been inserted in the film image reader 16. When a decision is made that the negative film 12 has been inserted in the film image reader 16, the decision in step 200 is positive and, in step 202 the conveyance of the negative film 12 is started.

In the next step 204, a decision is made as to whether or not information such as frame number, etc., of images recorded on the negative film 12 is enabled to be read. For example, in the case where information is recorded optically (e.g., by means of bar code or the like) on the edge portion of the negative film 12, the decision in step 204 is positive when the recording position value matches the frame number detection sensor 48 value. Alternatively, in the case where information is recorded magnetically on a transparent magnetic layer, formed on the rear side of the negative film, the decision in step 204 is positive when the magnetically encoded information matches the information from the read head 46.

When the decision in step 204 is negative, step 206 is executed and a decision is made as to whether or not an image fits an image detection position corresponding to the arrangement position of the image detection sensor 50. When the decision in step 206 is further negative, the routine goes to step 208 and a decision is made as to whether an image reaches the image reading position or not, that is, more particularly, whether the head pixel line of an image reaches the reading position or not. When the decision in step 208 is further negative, the routine goes back to step 202 and the respective decisions in steps 204, 206 and 208 are repeated while the conveyance of the negative film 12 is continued.

When the decision in step 204 is now positive, the routine goes to step 210 and information such as frame number, etc., is read by the frame number detection sensor 48 or the read head 46 so that the frame number that is read, is stored. When the decision in step 206 is positive, the routine goes to step 212 and the picture position and size are detected on the basis of an output signal from the picture detection sensor 50. In the next step 214, the picture position and size are stored so as to be related to the frame number. When the decision in step 208 is positive, an image scan-reading procedure (which will be described later) is carried out in step 216. In the next step 218, a decision is made whether the negative film 12 is finished or not. When the decision in step 218 is negative, the routine goes back to step 202 and the aforementioned procedures are repeated.

As described above, in the pre-scan portion 36, not only the procedures of frame number reading, picture position and size detection and image scan-reading are successively carried out with respect to one image frame, but the procedures are carried out in parallel with respect to the respective image frames.

The scan-reading procedure in the pre-scan portion 36 will be described below in detail with reference to the flow chart shown in FIG. 9. Occasionally, the head pixel line of an image is located in the reading position; an image of light transmitted through the pixel line among the light emitted from the lamp 52 and transmitted through the CC filter set 56, the light diffusion box 58 and the negative film 12 is formed on the photo-detecting surface of the CCD line sensor 62 by the image-forming lens 60; and a signal output from the CCD line sensor 62 is amplified by the amplifier 64, converted into a level corresponding to the density value by the LOG converter 66, converted into digital data by the A/D converter 68 and stored.

In step 250, density value data with respect to one pixel line are fetched from the A/D converter 68. In step 252, the density value data thus fetched are corrected in accordance with the variations in sensitivity of the plurality of sensor units arranged along the direction of the width of the negative film 12, and are stored in the image buffer 70. In step 254, the pulse motor 80 is driven by the driver 82 to thereby convey the negative film 12 by a predetermined quantity corresponding to the intervals of image trains.

In the next step 256, a decision is made as to whether or not the image reading for a picture is completed. When the decision in step 256 is negative, the routine goes back to step 250 and the procedure, from step 250 to step 256, is repeated until the decision in step 256 is positive. Accordingly, when the decision in step 256 is positive, and the routine goes to step 258, scanning of an entire image is completed so that data expressing densities of respective pixels, in images obtained by decomposing one image into three colors (R, G and B) (hereinafter referred to as "R image data", "G image data" and "B image data" respectively), are stored in the image buffer 70.

Figure 7:
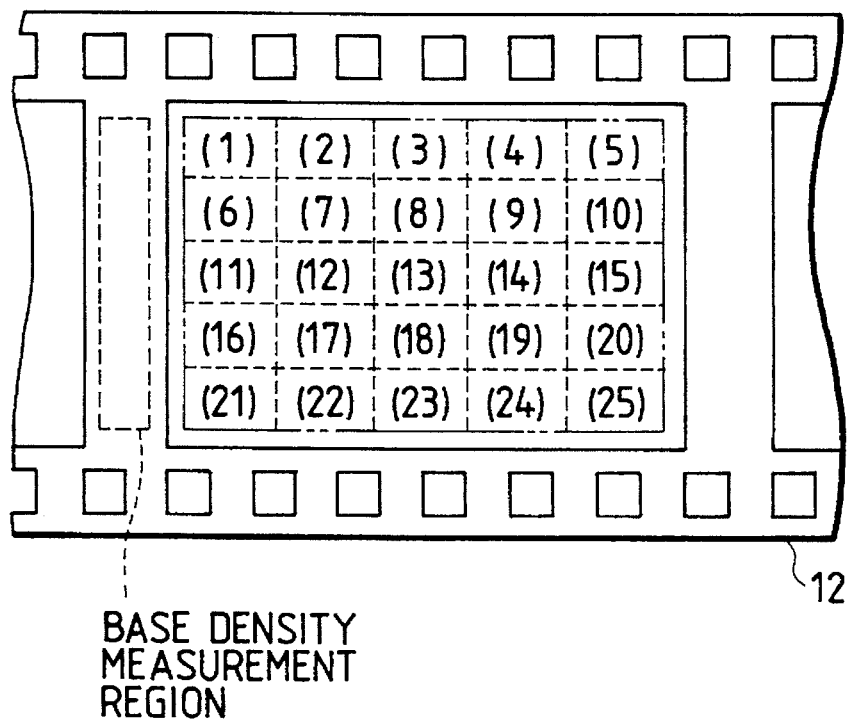
FIG. 7 is a plan view of a negative film for explaining the negative film scene extracting and region dividing procedure and showing the base density measurement region.

In step 258, the density of the base portion (see FIG. 7) of the negative film 12 is measured for the respective colors of R, G and B, and stored. In step 260, the data of a pixel having the smallest density value is extracted from the respective color image data stored in the image buffer 70. In step 262, the optimum light quantity is calculated for the lamp 84 in the fine-scan portion 38, with respect to the image being read, based on the extracted data. This is because the level of the output signal of the CCD line sensor 94 may be saturated when the image is read in the fine-scan portion 38, when the minimum value of the density value data is very small.

In step 264, correction is performed by subtracting the base density of the negative film 12, measured in step 258, from the density value of each pixel in the respective image data that is stored in the image buffer 70. In the next step 266, the respective image data stored in the image buffer 70 are averaged. For example, this averaging procedure can be carried out by substituting the average value for a greatly different density value to all pixels while comparing the density value of a predetermined pixel with the density values of ambient pixels with respect to the respective image data of R, G and B. As a result, even in the case where dust is deposited on a surface of the negative film 12, or in the case where the negative film 12 is damaged, the influence of these obstacles can be reduced.

In step 268, the respective image data of R, G and B are converted into pigment densities of C (cyan), M (magenta) and Y (yellow) so that C image data corresponding to a C image, M image data corresponding to an M image and Y image data corresponding to an Y image are respectively obtained. In the next step 270, as shown in FIG. 9, data for the pixels corresponding to the vicinity of the edge portion of the image, are removed from the respective image data of C, M and Y to thereby cut down a region surrounded by the virtual line in FIG. 9. In step 272, A picture is divided into a predetermined number n of areas, for example, 25 (n=5×5) areas as shown in the broken line in FIG. 9.

In step 274, the maximum values $C_{max}(i)$, $M_{max}(i)$ and $Y_{max}(i)$ (where i represents a code for identifying the area, the code having a value of from 1 to n) of the density values of the pixels belonging to one area, are extracted for each area. In step 276, the weighted average of the respective areas is calculated as a maximum C density reference value $C_{max}$ by using the maximum C density reference values $C_{max}(i)$ in the respective areas in accordance with the following expression (2):

$$C_{max} = \frac{\Sigma K(i) \cdot C_{max}(i)}{\Sigma K(i)} \quad (2)$$

in which K(i) represents the weight of an area (i). A weighted average of the maximum M density maximum values $M_{max}(i)$ in each area is calculated as the M density maximum reference value and a weighted average of the maximum Y density values $Y_{max}(i)$ in each area is calculated as the Y density maximum reference value in the same manner as described above. For example, the weights of the respective areas can be determined so that the weight of an area corresponding to the center portion of the picture, in which the possibility of a main subject existing is high, becomes higher. Although the quantity of light emitted from the lamp 52 has a distribution such that the peak quantity of light is along the optical axis, and gradually attenuates toward the periphery, the weights may be determined on the basis of this distribution.

In step 278, the average $D_{max}$ of the maximum reference values $C_{max}$, $M_{max}$ and $Y_{max}$ for the respective colors, are calculated according to the following expression (3).

$$D_{max} = (C_{max} + M_{max} + Y_{max})/3 \quad (3)$$

In the next step 280, the C image conversion coefficient $A_C$ is calculated to satisfy the following expressions (4).

$$D_{max} A_C \cdot C_{max} \quad (4)$$

Similarly, the M image conversion coefficient $A_M$ and the Y image conversion coefficient $A_Y$ are calculated according to the following expressions (5) and (6).

$$D_{max} = A_M M_{max} \quad (5)$$

$$D_{max} = A_Y Y_{max} \quad (6)$$

In the next step 282, a look-up table LUTc for converting C density into C' density to obtain a C' image is generated by successively substituting a value of from 0.0 to 2.0 for the C density in a conversion equation represented by the following expression (7) with use of the C image conversion coefficient $A_C$ obtained as described above, and which is stored.

$$C' = A_C \cdot C \quad (7)$$

With respect to M and Y, look-up tables LUTm and LUTy for converting M density into M' density to obtain an M' image and for converting Y density into Y' density to obtain an Y' image respectively are generated by substituting the value of the same range into conversion equations using the coefficients $A_M$ and $A_Y$ as represented by the following expressions (8) and (9) respectively, and which are stored.

$$M' = A_M M \quad (8)$$

$$Y' = A_Y Y \quad (9)$$

The conversions of C density, M density and Y density into C' density, M' density and Y' density with reference to the look-up tables are equivalent to conversions according to the expressions (7) to (9). In the expressions (4) to (6), for obtaining the coefficients $A_C$, $A_M$ and $A_Y$ for the aforementioned expressions, the values of the left sides of the equations are equal to each other ($D_{max}$) as described above.

Figure 13A:
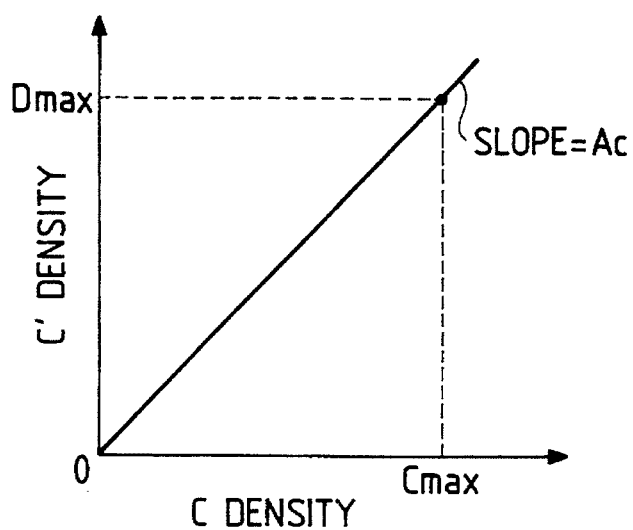
FIGS. 13(A)–(C) are graphs showing the processing for conversion of C, M and Y density into C', M' and Y' density in the first embodiment.
Figure 13B:
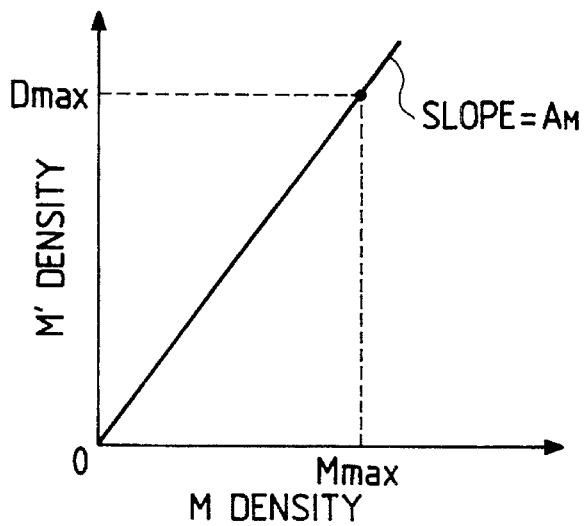
Figure 13C:
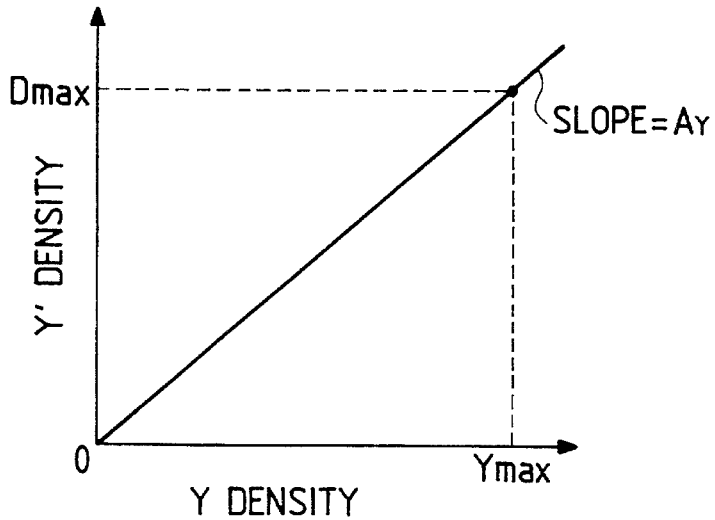

Accordingly, conversions in accordance with the expressions (7) to (9) are equivalent to conversions (corrections of density values) to make C' density, M' density and Y' density, after conversions of $C_{max}$, $M_{max}$ and $Y_{max}$ coincident with the average $D_{max}$ in the case where the values of $C_{max}$, $M_{max}$ and $Y_{max}$ vary as shown in FIGS. 13(A)–(C). Accordingly, when $C'=M'=Y'=D_{max}$, the C'+M'+Y' becomes the lightest gray (white) on the print so that gray balance in the lightest portion is established. Further, since all the measured values are converted by use of these conversion correlations, it is possible to improve the gray balance in a range from intermediate density to low density while maintaining the gray balance in the lightest portion.

In step 284, arithmetical operations are performed for showing an image on the display 72, C' image data, M' image data and Y' image data are obtained from C image data, M image data and Y image data. In step 286, positive image data (data expressing an image obtained by overlapping R', G' and B' images) are obtained on the basis of the C', M' and Y' image data so that a positive image is shown on the display 72 using the thus obtained data. By referring to this displayed image, for example, it is made possible for the operator to designate correction of color, density, etc., in accordance with exposure.

The image reading procedure in the fine-scan portion 38 will be described below with reference to a flow chart shown in FIG. 11. In step 300, conveyance of the negative film 12 is performed. In step 302, a decision is made as to whether the head pixel line reaches the reading position or not. When the decision in step 302 is negative, the routine goes back to step 300 and the procedure of steps 300 and 302 is repeated to continue the conveyance of the negative film 12 until the decision in step 302 is positive.

When the decision in step 302 is positive, the routine goes to step 304 and the optimum light quantity of the lamp 84, preliminarily obtained in the pre-scan portion 36, is fetched to thereby control the voltage supplied to the lamp 84 to a value corresponding to the light quantity. After a slight delay, while the light from the lamp stabilizes after execution of the procedure of step 304, the routine goes to step 306 and the image reading procedure is carried out in steps 306 to 312.

That is, in step 306, one-pixel-line's density value data is fetched from the A/D converter 100. In step 308, the density value data thus fetched is corrected in accordance with the variations in sensitivity of the large number of sensor units in the CCD sensor 94. The corrected data are then stored in the image buffer 70. In step 310, the pulse motor 104 is driven by the driver 106 to convey the negative film 12 by a predetermined quantity corresponding to the interval of the image trains. The amount of conveyance corresponds to the interval between the sensor units and is smaller than the quantity of conveyance in the pre-scan portion 36. Accordingly, in the fine-scan portion 38, the quantity of light transmitted through the respective pixels is measured while the image is finely divided into a larger number of pixels.

In the next step 312, a decision is made as to whether or not the reading of one-picture's image is completed. When the decision in step 312 is negative, the routine goes back to step 306 and the procedure from step 306 to step 312 is repeated until the decision in step 312 is positive. As a result, the R image data, G image data and B image data of a single image are stored in the image buffer 70. In the next step 314, shading correction is carried out. This is because the quantity of light emitted from the lamp 84 also has a distribution in which the peak light quantity is along the optical axis and is attenuates toward the periphery. In step 314, the image data stored in the image buffer 70 is corrected in accordance with the light quantity distribution which is measured in advance.

In step 316, correction is performed by subtracting the base density of the negative film 12, measured in the pre-scan portion 36, from the density values of the pixels in the respective image data which are stored in the image buffer 70. In step 318, the R, G and B image data are subjected to C, M and Y pigment density conversion to obtain C, M and Y image data respectively.

The pre-scan portion 36 and the fine-scan portion 38 differ in various aspects. For example, as described above, the pre-scan portion 36 and the fine-scan portion 38 differ in the interval between the sensor units in the CCD sensor, so that they differ in the conveyance pitch at the time of image reading. Accordingly, the image data obtained in the pre-scan portion 36 and the image data obtained in the fine-scan portion 38 are different in the area of one pixel. The sensitivity of the CCD line sensor may vary. Therefore, in step 320, the image data obtained in step 318 is corrected in accordance with the difference between various kinds of conditions, such as pixel area difference.

In step 322, the look-up tables LUTc, LUTm and LUTy generated in the pre-scan portion 36 are fetched. In the next step 324, the C, M and Y image data obtained in the fine-scan portion 38 are converted into C', M' and Y' image data by referring to the fetched look-up tables. Although the aforementioned look-up tables are used for obtaining C', M' and Y' image data from C, M and Y image data at a high speed, the present invention is not limited to the use of such look-up tables. For example, C', M' and Y' image data may be obtained by substituting pixel data constituting C, M and Y image data into any one of the aforementioned equations (7), (8) and (9).

In step 326, C', M' and Y' image data expressing C', M' and Y' images are converted into R', G' and B' image data expressing R', G' and B' image data as a positive image. This conversion is carried out so that the difference (density width) between the maximum density value and the minimum density value in the positive image, after conversion, corresponds to the sensitivity difference of the print paper 112.

As described above, in the C', M' and Y' image data, color balance is corrected to make the maximum reference values of the respective colors coincident with each other. That is, to make the maximum density values substantially coincident with each other. Accordingly, in an image obtained by mixing R', G' and B' images, the color of a region corresponding to the white or near white portion of the subject is formed from a color corresponding to white. That is, even in the case where the color of the aforementioned portion is shifted from white by photographing under different kinds of light sources, correction is performed to set the color to the color corresponding to white. Further, because the maximum reference value varies little, even in an image in which density failure or color failure has occurred, gray balance in the C', M' and Y' images is maintained so that gray balance in the R', G' and B' images is not distorted by the influence of the failure.

Further, in step 326, exposure data expressing exposure values of R, G and B to the respective pixels are obtained by exponentially converting the density values of the respective pixels in the R', G' and B' image data. According to the above description, the light quantity distribution expressed by the exposure data is made equal to the distribution of light transmitted through the image when light is radiated to the image so as to be uniform in the quantity of light, upon the assumption that an ideal image obtained by overlapping C', M' and Y' images is recorded on the negative film 12.

In step 328, the exposure data thus calculated are transferred to the control circuit 122 of the printer portion 110. In step 330, a decision is made as to whether or not calculation of exposure values, with respect to all images recorded on the negative film 12, is finished. When the decision in step 330 is negative, the routine goes back to step 300 and the procedure from step 300 to step 330 is repeated. When the decision in step 330 is positive, the routine is terminated.

Figure 12:
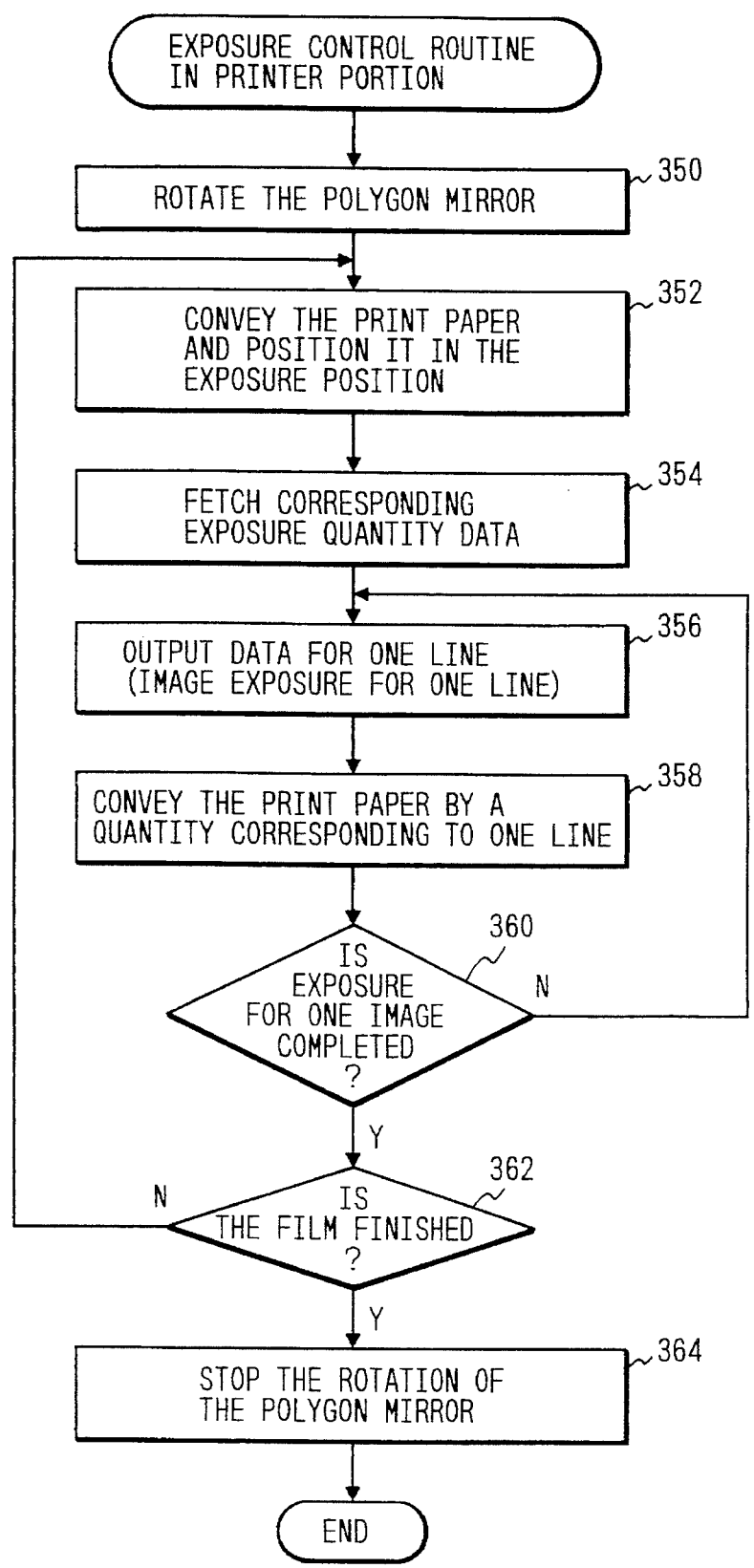
FIG. 12 is a flow chart for explaining the exposure procedure in a printer portion.

In the following, the exposure control procedure in the printer portion 110 will be described with reference to the flow chart shown in FIG. 12. In step 350, rotation of the polygon mirror is started. In step 352, the print paper 112 is conveyed by the pulse motor 144 to thereby place the non-exposed portion of the print paper in an exposure position. In step 354, exposure data corresponding to an image to be exposed is fetched. In step 356 and after step 356, exposure of the image to the print paper is performed. That is, in step 356, among the thus fetched exposure data, an exposure control signal corresponding to R exposure data for the first line, an exposure control signal corresponding to G exposure data and an exposure control signal corresponding to B exposure data are delivered to the AOM drivers 120R, 120G and 120B respectively.

The AOM drivers 120R, 120G and 120B send high-frequency signals to the AOMs 133R, 133G and 133B respectively when the level of the input exposure control signal is high. As a result, recording laser beams are emitted from the AOMs 133R, 133G and 133B for a time corresponding to the pulse width d at intervals corresponding to the pulse period $t_0$ for each of the exposure control signals, and are mixed by the dichroic mirrors 134G and 134B, so that the resulting mixture beam enters the polygon mirror 126.

The position of the laser beam radiation onto the print paper 112 is successively moved in accordance with the rotation of the polygon mirror 126. However, the pulse period $t_0$ of each of the exposure control signals is determined so that the quantity of movement of the laser beam radiation position corresponds to the interval between pixels of the image to be recorded on the print paper 112. Accordingly, because the laser beam radiation time for each pixel varies in accordance with the pulse width d, the exposure Value for each pixel is changed in accordance with the exposure data. The laser beam reflected by the polygon mirror 126 is further reflected by the mirrors 130 and 140 and radiated onto the print paper 112, so that one-pixel-line's (one-line's) exposure to the print paper 112 is performed whenever one line of laser beam scanning is carried out by the polygon mirror 126.

When the an exposure of one-line is finished, the routine goes to step 358 in which the print paper 112 is conveyed by a predetermined quantity corresponding to the one-line's interval, by the pulse motor 4 until the rotation angle of the polygon mirror 126 is set to a rotation angle in which the incident laser beam is reflected toward the scanning start portion. In the next step 360, a decision is made as to whether or not exposure of one-pixel-line is finished. When the decision in step 360 is negative, the routine goes back to step 356 in which exposure control signals corresponding to the exposure data for the next one line are delivered to the AOM drivers 120R, 120G and 120B to perform the next exposure of a line, in the same manner as described above.

By repeating the procedure from step 356 to step 360 a predetermined number of times, image exposure is performed in accordance with the exposure data. When exposure of an image is finished, the decision in step 360 is positive and the routine goes to step 362. In step 362, a decision is made as to whether or not exposure, in accordance with all transferred exposure data, is finished. When the decision in step 362 is negative, the routine goes back to step 352 in which exposure for the next image is carried out in the same manner as described above. When the decision in step 362 is positive, the rotation of the polygon mirror 126 is stopped in step 364 and the exposure control routine is finished.

The non-exposed portion of the print paper 112 with its exposure control routine finished is cut by the cutter portion 116 and rewound into the magazine 114. At the same time, the image exposed portion of the print paper 112 is successively delivered to the respective treating tanks of the processor portion 154 and then delivered to the drying portion 166, so that the exposure portion is subjected to the treatments of color development, bleach-fixing, water washing and drying, so that the exposed image in the printer portion is made visible. Upon completion of drying, the print paper 112 is cut into image frames and discharged from the printer processor 18.

A second embodiment of the present invention is described below. The second embodiment has the same structure as the first embodiment, and for simplification of the description, like numerals refer to like parts. Only the operation of the second embodiment different from that of the first embodiment is described below.

Figure 9:
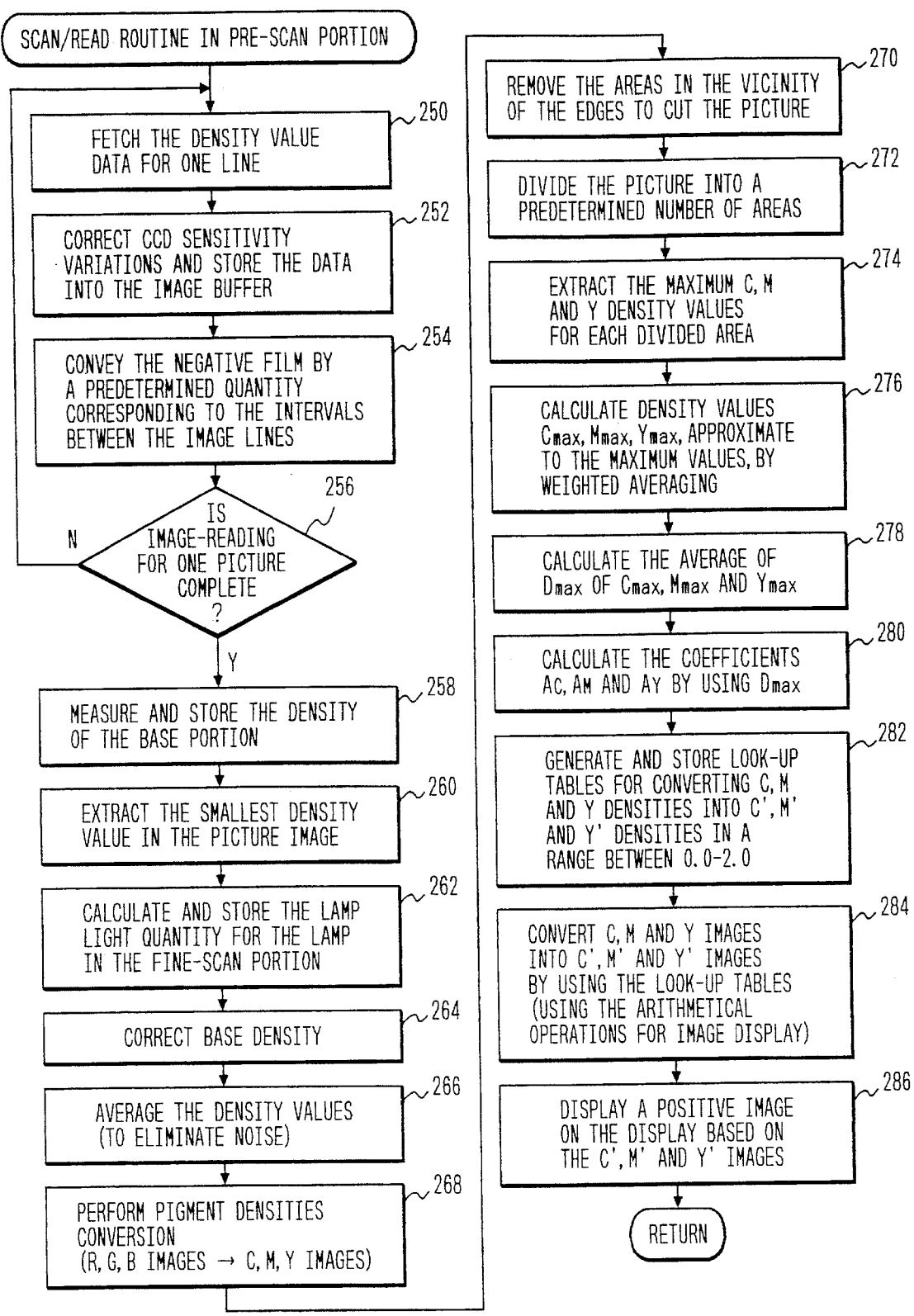
FIG. 9 is a flow chart showing the scan-reading procedure of the pre-scan portion.
Figure 10:
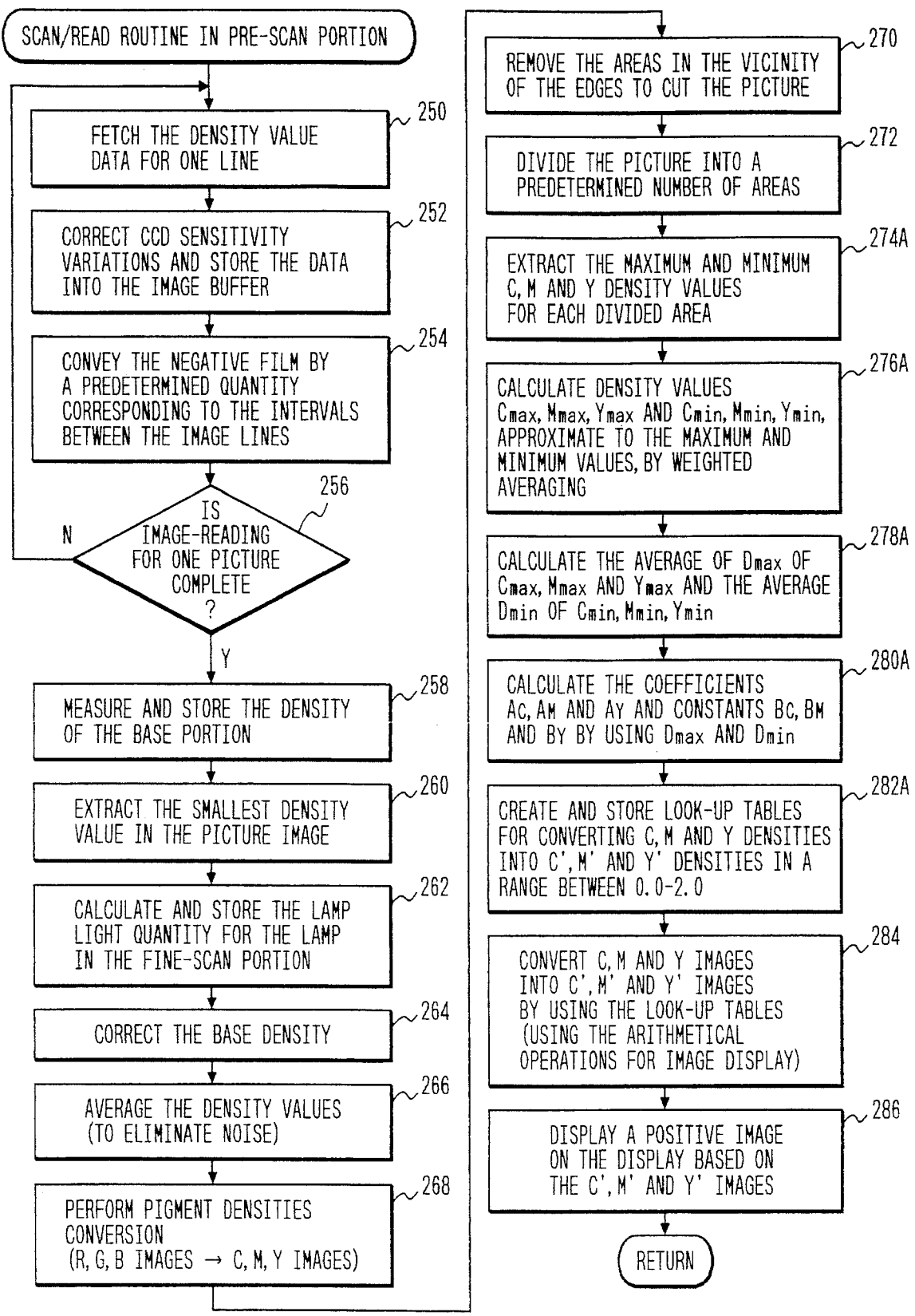
FIG. 10 is a flow chart showing the scan-reading procedure of the pre-scan portion in the second embodiment.

The second embodiment is different from the first embodiment in the scan-reading routine of the pre-scan portion 36 (the procedure from step 274 to step 284 in the flow chart shown in FIG. 9). That is, as shown in the flow chart of FIG. 10, in step 274A, minimum density values $C_{min}(i)$, $M_{min}(i)$ and $Y_{min}(i)$ as well as maximum density values $C_{max}(i)$, $M_{max}(i)$ and $Y_{max}(i)$ are extracted in the respective divided regions. In step 276A, the weighted average of the maximum values $C_{max}(i)$ of C density in the respective regions is calculated as the maximum reference value $C_{max}$ of C density, in accordance with the aforementioned equation (2). At the same time, the weighted average of the respective regions is calculated as the minimum reference value $C_{min}$ of C density, in accordance with the following equation (10) by using the minimum values $C_{min}(i)$ of C density of the respective regions calculated as described above.

$$C_{min} = \frac{\Sigma K(i) \cdot C_{min}(i)}{\Sigma K(i)} \quad (10)$$

in which K(i) represents the weight of an area (i).

A maximum M density reference value $M_{max}$ and a minimum M density reference value $M_{min}$ are calculated on the basis of the maximum M density values $M_{max}(i)$ and the minimum M density values $M_{min}(i)$ in the respective areas, in the same manner as described above. A maximum Y density reference value $Y_{max}$ and a minimum Y density reference value $Y_{min}$ are calculated on the basis of the maximum Y density values $Y_{max}(i)$ and the minimum Y density values $Y_{min}(i)$ in the respective areas, in the same manner as described above.

In the next step 278A, the average $D_{max}$ of the maximum reference values $C_{max}$, $M_{max}$ and $Y_{max}$ for the respective colors, is calculated in accordance with the above expression (3), and the average $D_{min}$ of the minimum reference values $C_{min}$, $M_{min}$ and $Y_{min}$ for the respective colors, are calculated in accordance with the following expressions (11).

$$D_{min}=(C_{min}+M_{min}+Y_{min})/3 \tag{11}$$

In the next step 280A, the C image conversion coefficient $A_C$ and the constant $B_C$ are calculated to satisfy simultaneous equations of the following expressions (12).

$$D_{max}=A_C \cdot C_{max}+B_C, \quad D_{min}=A_C \cdot C_{min}+B_C \tag{12}$$

Similarly, M image conversion coefficient $A_M$ and constant $B_M$ and Y image conversion coefficient $A_Y$ and constant $B_Y$ are calculated in accordance with simultaneous equations of the following expressions (13) and (14).

$$D_{max}=A_M \cdot M_{max}+B_M, \quad D_{min}=A_M \cdot M_{min}+B_M \tag{13}$$

$$D_{max}=A_Y \cdot Y_{max}+B_Y, \quad D_{min}=A_Y \cdot Y_{min}+B_Y \tag{14}$$

In the next step 282A, a look-up table LUTc, for converting C density into C' density to obtain a C' image, is generated by successively substituting a value between 0.0 to 2.0 for the C density in a conversion equation represented by the following expression (15), with use of the C image conversion coefficient $A_C$ and constant $B_C$ obtained above and which is stored.

$$C'=A_C \cdot C+B_C \tag{15}$$

With respect to M and Y, look-up tables LUTm and LUTy for converting M density into M' density, to obtain an M' image, and for converting Y density into Y' density, to obtain an Y' image respectively, are generated by substituting the value of the same range in the conversion equations using the coefficient $A_M$ and constant $B_M$ and the coefficient $A_Y$ and constant $B_Y$ as represented by the following expressions (16) and (17), respectively and which are stored.

$$M'=A_M \cdot M+B_M \tag{16}$$

$$Y'=A_Y \cdot Y+B_Y \tag{17}$$

Figure 14A:
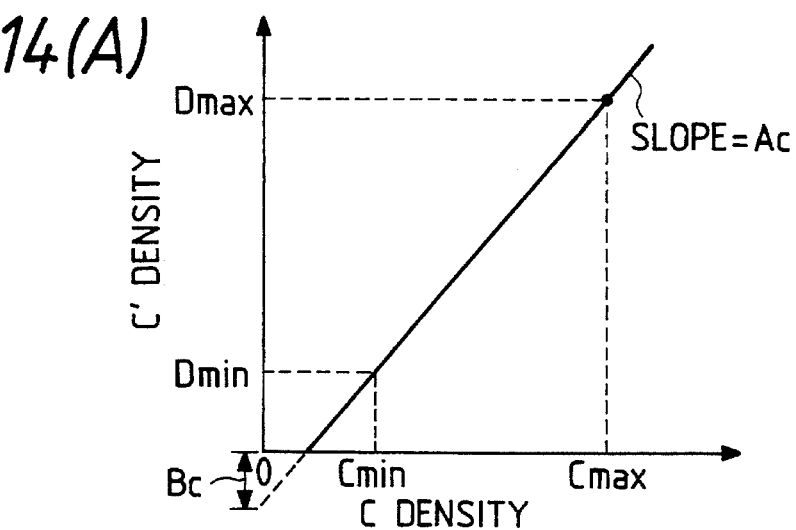
FIGS. 14(A) to 14(C) are graphs showing the processing for conversion of C, M and Y densities into C', M' and Y' densities in the second embodiment.
Figure 14B:
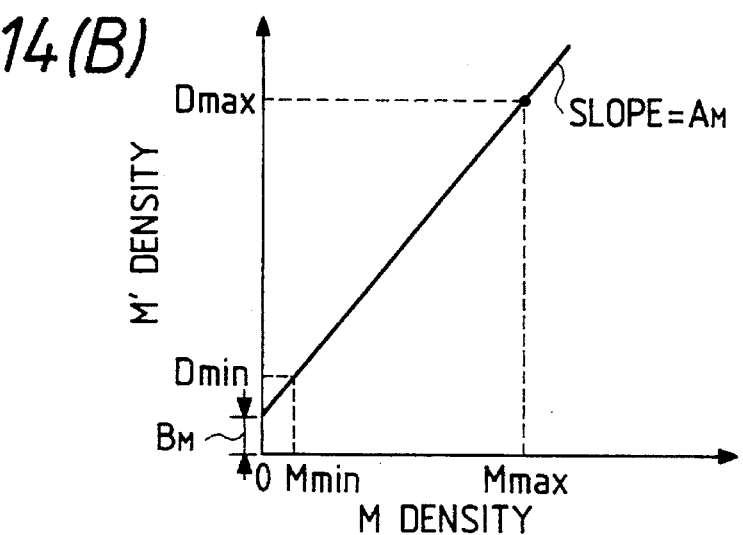
Figure 14C:
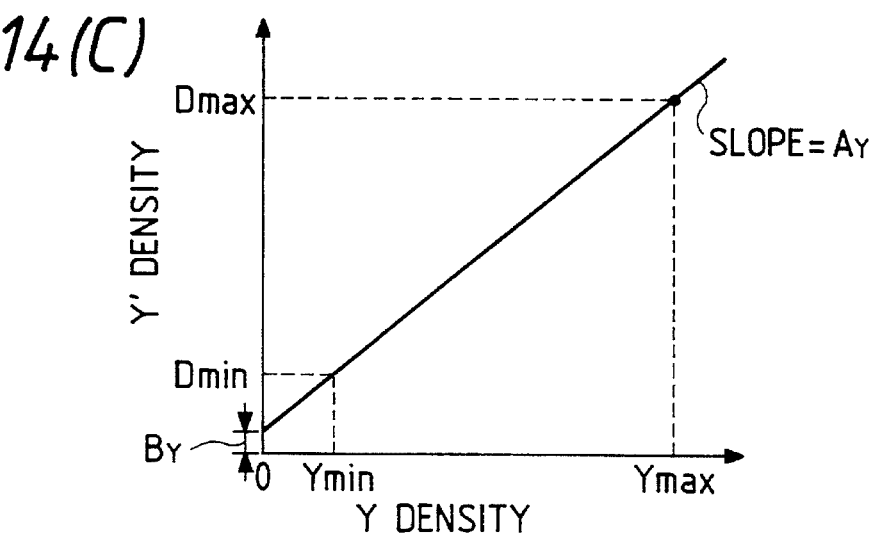

The conversions of C density, M density and Y density into C' density, M' density and Y' density, with reference to the look-up tables, are equivalent to conversions in accordance with the expressions (15) to (17). In the expressions (12) to (14), for obtaining the coefficients $A_C$, $A_M$ and $A_Y$ and the constants $B_C$, $B_M$ and $B_Y$ for the aforementioned expressions, the values of the left sides of the equations are equal to each other ($D_{max}$ or $D_{min}$) as described above. Accordingly, conversions in accordance with the expressions (15) to (17) are equivalent to conversions (corrections of density values) that make C' density, M' density and Y' density, after conversions of $C_{max}$, $M_{max}$ and $Y_{max}$, coincident with the average and make C' density, M' density and Y' density, after conversions of $C_{min}$, $M_{min}$ and $Y_{min}$, coincident with the average $D_{min}$. This is true even in the case where the values of $C_{max}$, $M_{max}$ and $Y_{max}$ and the values of $C_{min}$, $M_{min}$ and $Y_{min}$ vary as shown in FIGS. 14(A)–(C).

Accordingly, in the case of $C'=M'=Y'=D_{max}$, C'+M'+Y' is made as the lightest gray (white) on a print so that gray balance in the lightest portion is maintained. In the case of $C'=M'=Y'=D_{min}$, C'+M'+Y' is made as the darkest portion (black) on a print so that gray balance in the darkest portion is maintained. Further, because all photometric values are converted by using the conversion correlations, gray balance in intermediate density can be improved while gray balance in the lightest portion and the darkest portion are maintained.

When exposure of an image is carried out in accordance with exposure data which are calculated by using the C', M' and Y' image data, obtained in the second embodiment in the same manner as in the first embodiment, disordering of color balance caused by the influence of density failure, color failure, etc., is avoided so that a print having appropriate color balance across the entire scene can be obtained even where an image is photographed under different kinds of light sources. Further, since printing is performed so that the white and black portions of the subject are made white and black respectively, the printed picture highly conforms to a human's psychological perception.

Calculation of the coefficients $A_C$, $A_M$ and $A_Y$ and the constants $B_C$, $B_M$ and $B_Y$ is not limited to the aforementioned method. For example, with respect to the coefficient $A_C$ and the constant $B_C$ used for conversion of C density, coefficients $A_C(i)$ and constants $B_C(i)$ in the respective regions may be calculated in accordance with the following equations (18) based on the maximum values $C_{max}(i)$ and the minimum values $C_{min}(i)$ of C density extracted for the respective regions:

$$D_{max}=A_C(i) \cdot C_{max}(i)+B_C(i) \quad D_{min}=A_C(i) \cdot C_{min}(i)+B_C(i) \tag{18}$$

and then weighted averages may be calculated in accordance with the following equations (19) by using weights K(i) for the respective regions.

$$\left. \begin{array}{l} A_c = \dfrac{\Sigma K(i) \cdot A_c(i)}{\Sigma K(i)} \\[6pt] B_c = \dfrac{\Sigma K(i) \cdot B_c(i)}{\Sigma K(i)} \end{array} \right] \tag{19}$$

The coefficient $A_M$ and the constant $B_M$ used for conversion of M density, and the coefficient $A_Y$ and the constant $B_Y$ used for conversion of Y density can be calculated in the same manner as described above.

Figure 15:
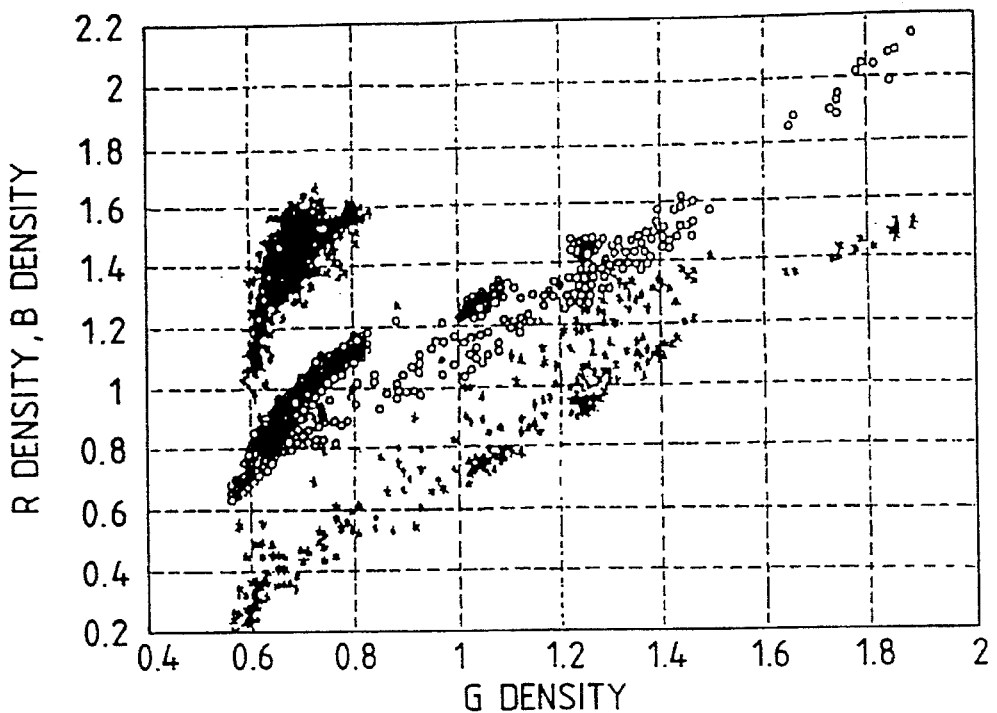
FIG. 15 is a color coordinate graph Showing color balance of respective pixels of a negative image in which R failure has occurred.

An example of a result of an experiment for comparing the gray balance correcting method according to the invention with the conventional integral neutral method is described below. FIG. 15 is a graph showing the case where the results of scan-reading a negative image in which R failure has occurred are plotted, by pixel, on a coordinate system with G density of each pixel as the abscissa and with R density versus G density and B density versus G density as the ordinate. In FIG. 15, a group greatly biassed on the ordinate side among the distribution of points "*" representing R density versus G density expresses pixels of a red ground portion having a wide area in the image.

Figure 16:
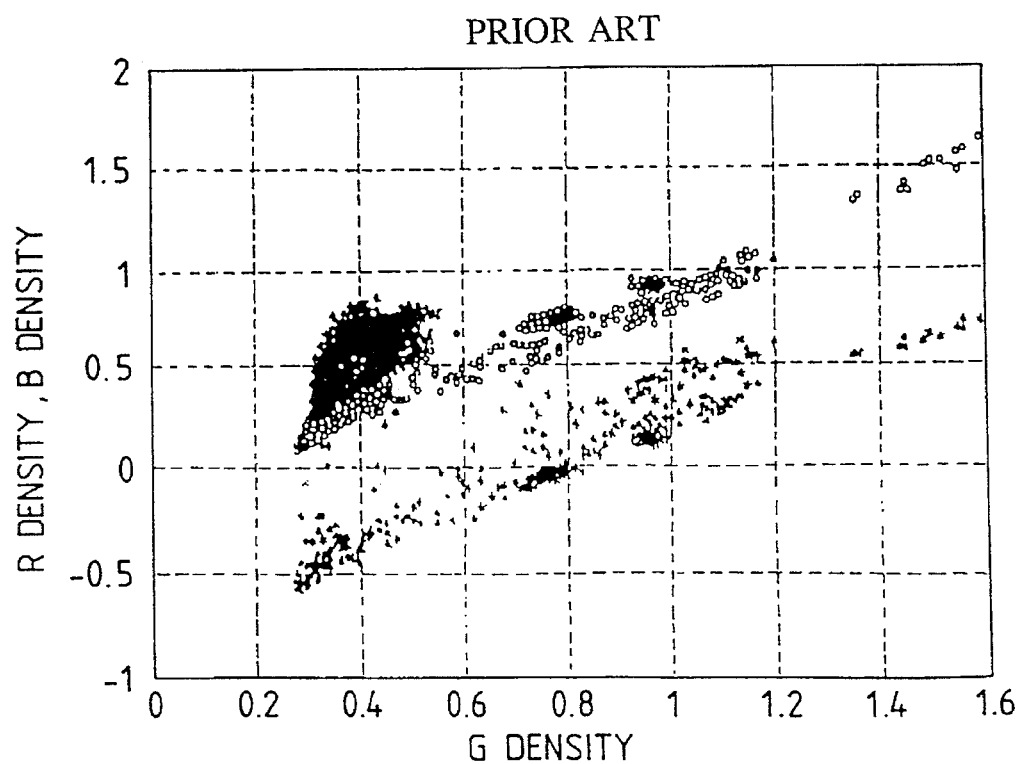
FIG. 16 is a color coordinate graph showing the experimental results of printing by applying an integral neutral method to the negative image of FIG. 15.

A result of printing on the print paper by applying the integral neutral method to the negative image to determine exposure on the basis of accumulated transmission density is shown in FIG. 16. In FIG. 16, the group of points "*" greatly biassed on the ordinate side in FIG. 15 move near to the position of a line passing through the origin and having a slope of "1", so that a large number of points "*" are distributed at positions biassed on the abscissa side from the line with the movement. It can be understood from the result that color balance of the main subject is affected by the color (red) of the background portion so that the color balance is not maintained.

Figure 17:
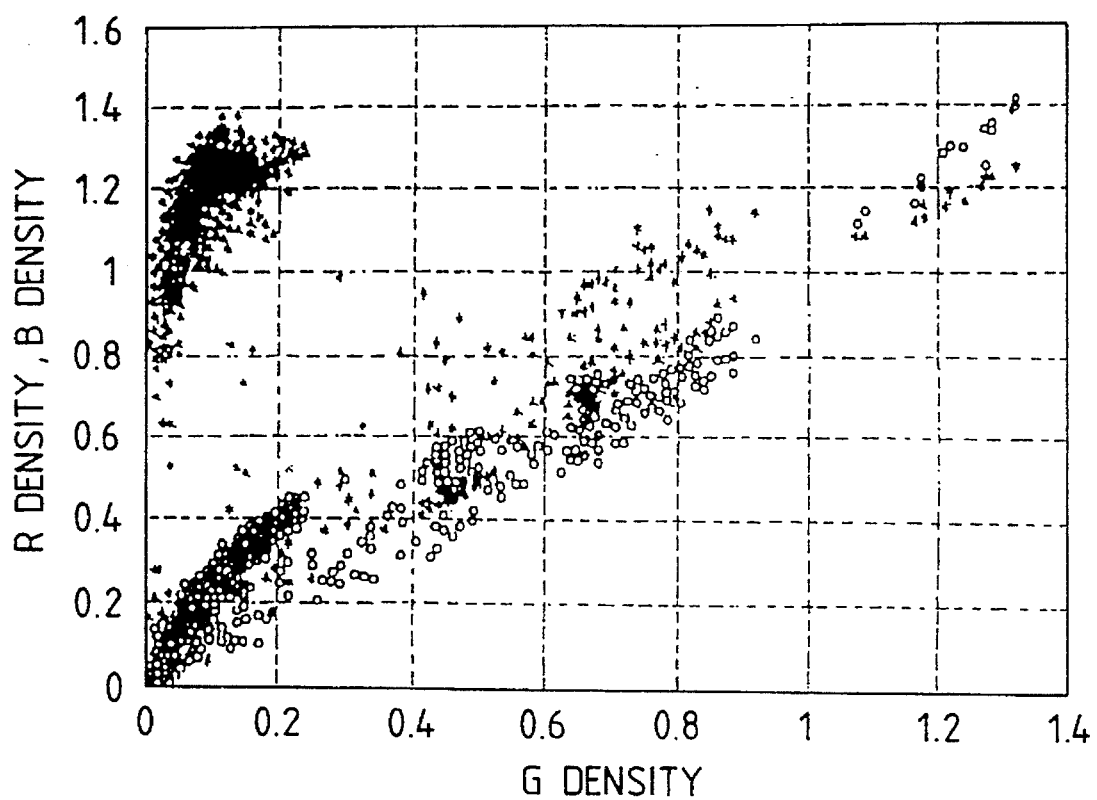
FIG. 17 is a color coordinate graph showing the experimental results of printing by applying the present invention to the negative image of FIG. 15.

However, FIG. 17 shows the results of printing on the print paper by applying the gray balance correcting method according to the present invention, to the same negative image to determine exposure. Plotted points are classified into two groups, that is, the group of points with good gray balance and at positions near the line passing through the origin and having a slope of "1", and the group of points consisting of points "*" and having the color ratio greatly inclined toward the R side. It is to be understood that not only color balance of the main subject is maintained but the red color of the background portion is reproduced to the color at the time of photographing. When the gray balance correcting method according to the present invention is applied, an appropriate printing result can be obtained with respect to an image (for example, in which failure has occurred) which cannot be obtained conventionally.

Although the above embodiment has been described for the case where $D_{max}$ is made the average of the maximum reference values $C_{max}$, $M_{max}$ and $Y_{max}$ of the respective colors, and $D_{min}$ is made the average of the minimum reference values $C_{min}$, $M_{min}$ and $Y_{min}$ of the respective colors, it is to be understood that $D_{max}$ and $D_{min}$ are merely references for making the density values of the respective colors coincident with each other and that the invention is not limited thereto. For example, these values may be set as predetermined constant values without any change of values by image, or any one of $C_{max}$, $M_{max}$ and $Y_{max}$ and any one of $C_{min}$, $M_{min}$ and $Y_{min}$ may be used.

A third embodiment of the present invention is described below. The third embodiment has the-same structure as the first and second embodiments, and for simplification of the description, like numerals refer to like parts. Only the operation of the third embodiment that is different from that of the second embodiment is described below.

Figure 11:
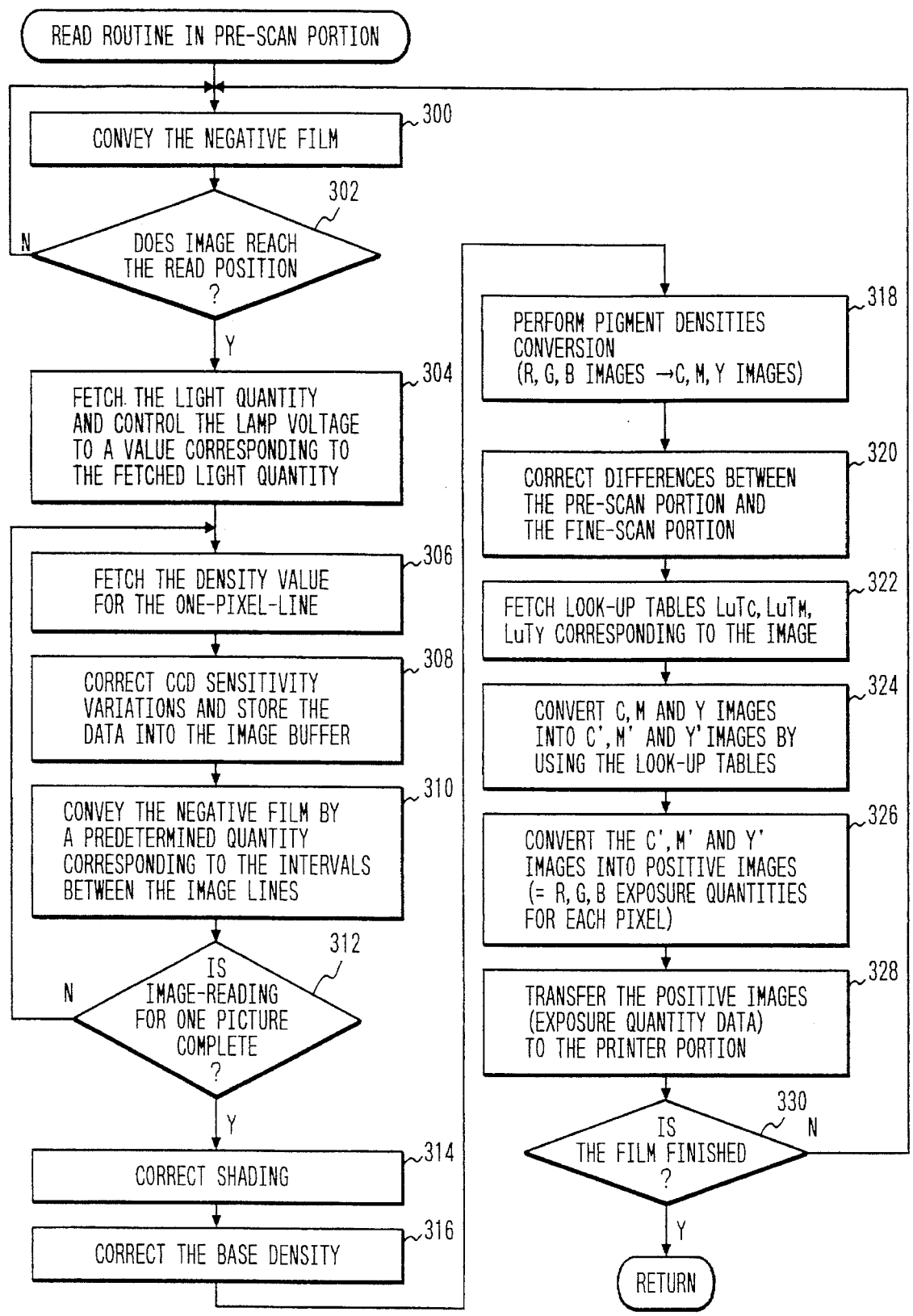
FIG. 11 is a flow chart for explaining the reading procedure in a fine-scan portion in the first embodiment.

The third embodiment is similar to the second embodiment, but differs in steps 322 and 324, shown in FIG. 11, of the image reading procedure for the fine-scan portion 38. In a third embodiment, a gray balance correcting procedure is carried out, beginning with step 370 shown in FIG. 18, after execution of step 320, shown in FIG. 11.

Figure 18:
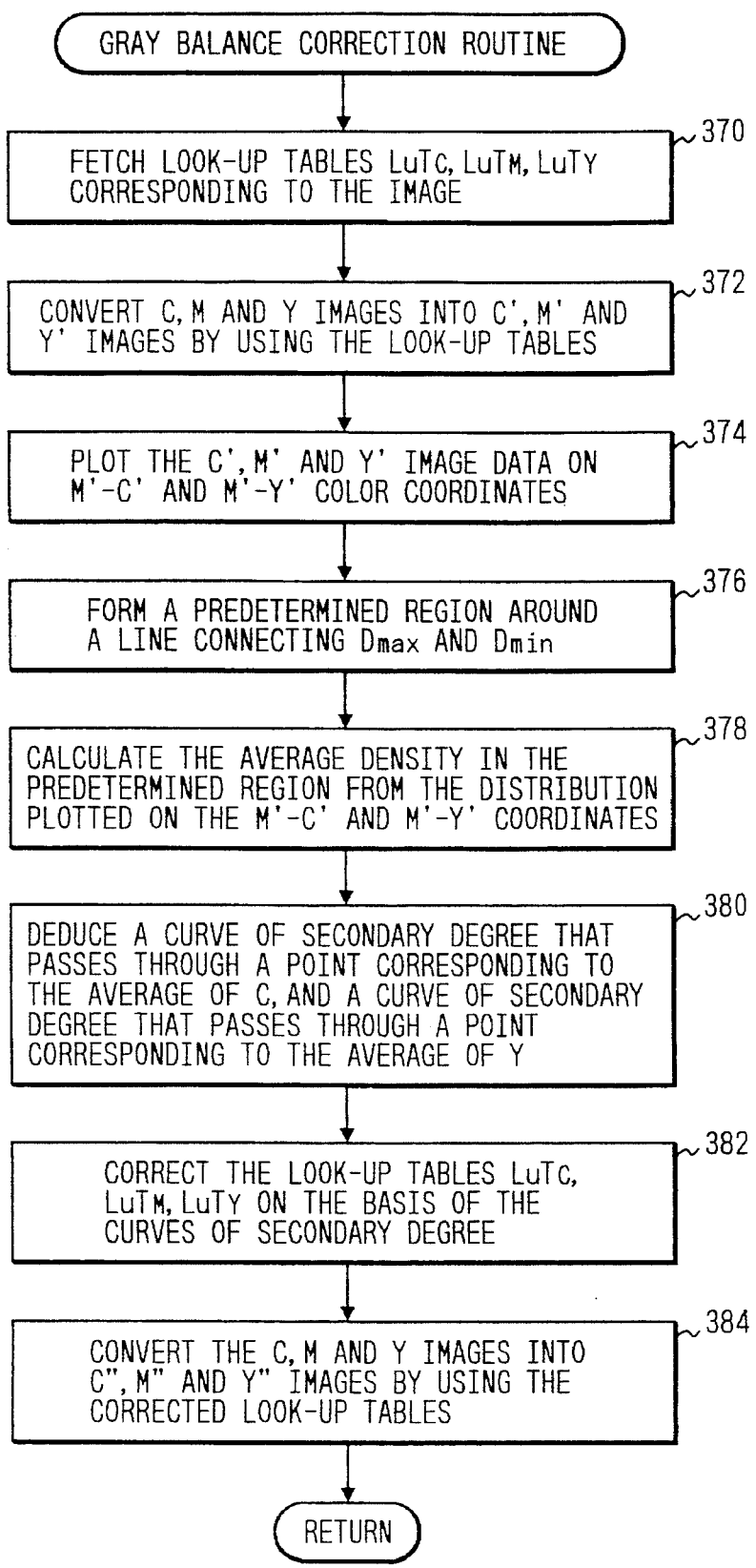
FIG. 18 is a flow chart for explaining the detail of the gray balance correcting procedure in the fine-scan portion of the third embodiment.

The gray balance correcting procedure is described in detail with reference to the flow chart of FIG. 18. First, in a step 370, look-up tables LUTc, LUTm and LUTy generated in the pre-scan portion 36 are fetched. In the next step 372, the C image data, M image data and Y image data obtained in the fine-scan portion 38 are converted into C' image, M' image data and Y' image data by referring to the fetched look-up tables.

The look-up tables are used to quickly obtain C', M' and Y' image data from C, M and Y image data. The present invention is not limited to the use of such look-up tables. For example, C', M' and Y' image data may be obtained by substituting pixel data, consisting of C, M and Y image data, into any one of the aforementioned equations (7), (8) and (9).

Figure 19A:
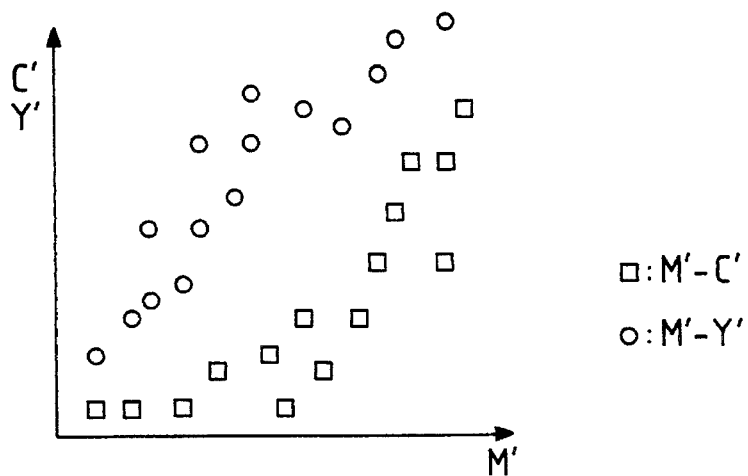
FIG. 19(A) is a graph showing data plotted on color coordinates; 19(B) is a graph showing a predetermined region S; and 19(C) is a graph showing curves of secondary degree $P_C$ and $P_Y$ passing through the averages respectively.
Figure 19B:
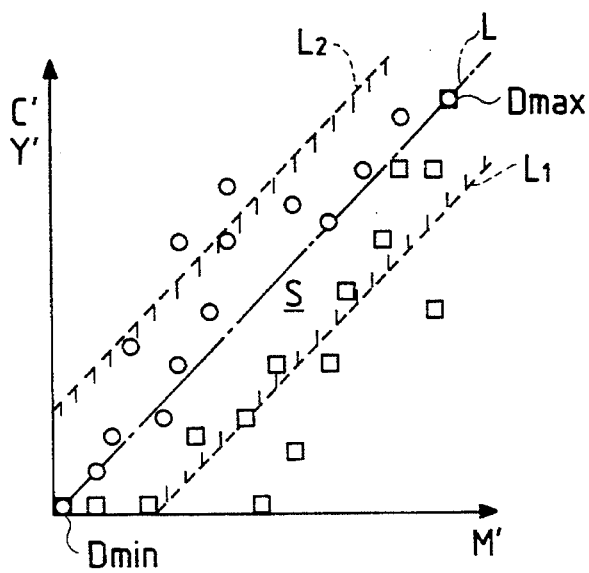

In the next step 374, the C', M' and Y' image data are plotted on color coordinates for the respective pixels. Although described here as a color coordinate system with M' density data plotted along the abscissa and with C' and Y' density data plotted along the ordinate, the present invention is not limited to such a coordinate system as various kinds of color coordinate systems may be used. For example, a color coordinate system with a color other than M as a reference may be used. For the present, however, a color coordinate graph as shown in FIG. 19(A) is obtained. In step 376, as shown in FIG. 19(B), a predetermined region S is selected, and a line L formed that connects the values $D_{max}$ and $D_{min}$. In this embodiment, the boundaries of the predetermined region S are determined by lines $L_1$ and $L_2$ which are obtained by moving the line L in a parallel direction by a predetermined value, on either side of the line L, as shown in FIG. 19(B).

It should be understood that the present invention is not limited to the formation of the predetermined region S, as described above. For example, in the case where a color coordinate system with density M' as the abscissa and with C'/M' and Y'/M' as the ordinate is used, the respective values of C'/M' and Y'/M' have $D_{max}$ and $D_{min}$ values of 1.0 so that the line L is formed parallel to the abscissa. In this case, the predetermined region S may be formed so that the region S contains the line L and the respective values of C'/M' and Y'/M' are in a range of 1.0±α.

As described above, the respective densities of C', M' and Y' are coincident with each other at $D_{max}$ and $D_{min}$. The line connecting the two points expresses a reference of appropriate gray balance which is estimated when the C', M' and Y' image data is converted. In the case of a general image, plotted points are distributed on, or in the vicinity of the line L. However, the distribution can also be formed such that the data is far from the line L, for example, when color failure occurs in an image. Such a distribution corresponds to a high-saturation portion of the image, so that a decision can be made that this distribution corresponds to the background portion. In the case where the distribution of data, in a region corresponding to intermediate density, is only slightly shifted from the line, a decision can be made that the gray balance in the intermediate density of the respective images of C', M' and Y' is slightly shifted.

Figure 19C:
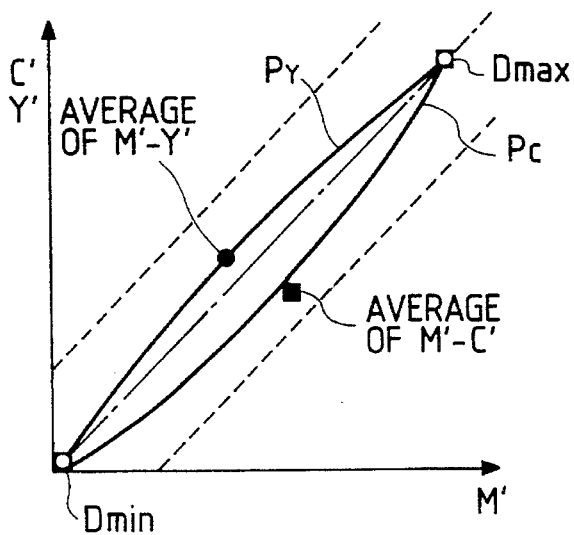

In a step 378, the average of the C' data with respect to M' and the average of the Y' data with respect to M' are calculated by using only the data falling within the predetermined region S, and not using the data outside of the predetermined region S as plotted on the color coordinate graph. Such corresponding points are plotted on the color coordinate graph as shown in FIG. 19(C). By calculating the averages without using the data plotted outside of the predetermined region S, the influence of color failure can be eliminated, and these averages can be used as reference values for the appropriate gray balance in the intermediate density areas in the image.

Therefore, in step 380, as shown in FIG. 19(C), a curve of secondary degree $P_C$ passing through $D_{max}$, $D_{min}$ and the average of the C', data with respect to M', and a curve of secondary degree $P_Y$ passing through $D_{max}$, $D_{min}$ and the average of the Y' data with respect to M' are deduced. Because $D_{max}$, $D_{min}$, the average C' data with respect to M', and the average of the Y' data with respect to M' are smoothly connected by the curves $P_C$ and $P_Y$, there is a very high probability that these curves express the appropriate gray balance between $D_{max}$ and $D_{min}$. The deduction of the curves of secondary degree is an example of a procedure for predicting the change between three points and performing interpolation, but it should be understood that the present invention is not limited thereto.

In a step 382, the look-up table LUTc is corrected on the basis of the curve $P_C$ so that a conversion correlation of the C density (see FIG. 14(A)) with respect to a conversion correlation of the M density (see FIG. 14(B)) is expressed by curve of secondary degree $P_C$. In this manner, the look-up table LUTc for converting C density into C" density is obtained in accordance with the conversion correlation shown in FIG. 20(A). Further, the look-up table LUTy is corrected on the basis of the curve $P_Y$ so that conversion correlation of the Y density (see FIG. 14(C)) with respect to conversion correlation of the M density is expressed by the curve of secondary degree $P_Y$. In this manner, the look-up table LUTy for converting Y density into Y" density is obtained in accordance with the conversion correlation shown in FIG. 20(C). The look-up table LUTm is not corrected as shown in FIG. 20(B).

Figure 20A:
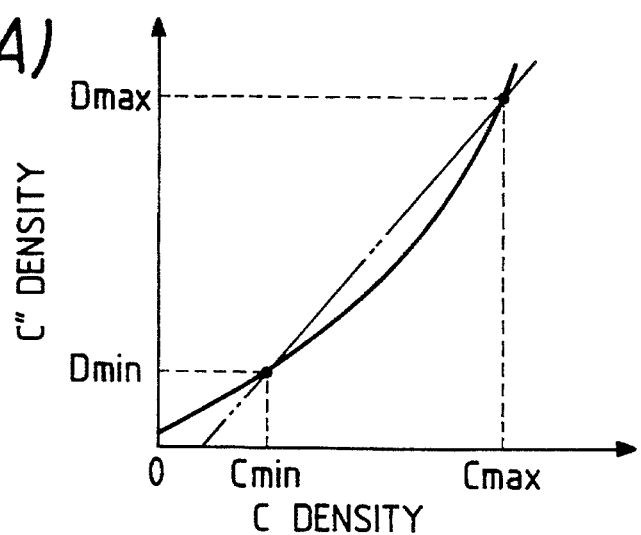
FIGS. 20(A)–(C) are graphs for explaining the procedure for converting C, M and Y density into C", M" and Y" density respectively.
Figure 20B:
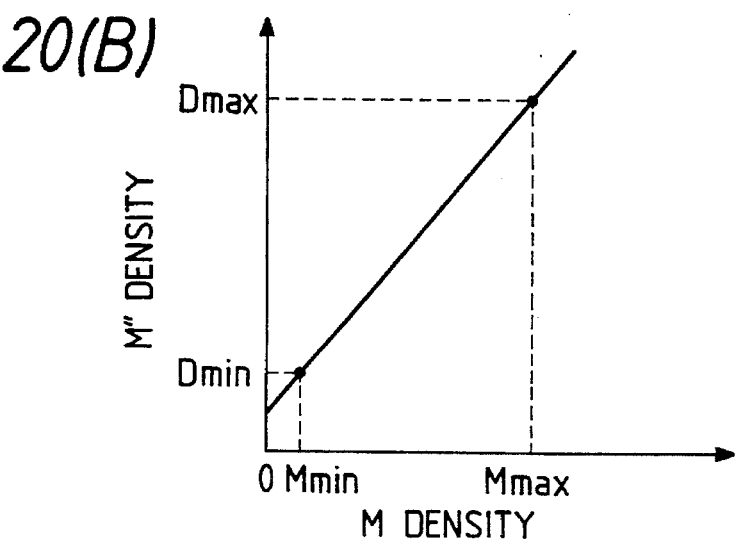
Figure 20C:
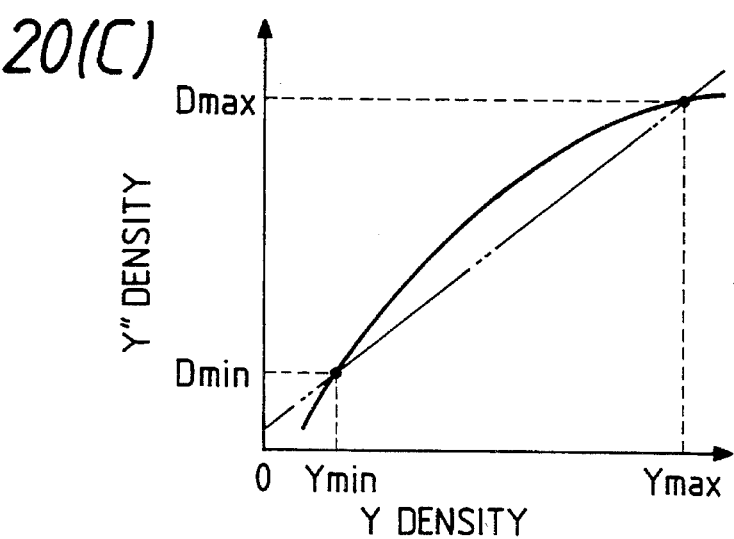

In a step 384, C" image data, M" image data and Y" image data are obtained from C, M and Y image data by referring to the look-up tables LUTc, LUTm and LUTy which express the conversion correlations shown in FIGS. 20(A)–(C). By using the aforementioned look-up tables, not only are the maximum and minimum reference values of the respective colors converted to be made coincident with each other, but the balance of C and Y with respect to M for intermediate densities is corrected by referring to the curves of secondary degree $P_C$ and $P_Y$.

With respect to this procedure, the invention is not limited to the use of such look-up tables. For example, C", M" and Y" image data may be obtained by substituting pixel data consisting of C, M and Y image data into the relation equations representing the aforementioned curves of secondary degree $P_C$ and $P_Y$. After the procedure of the step 384 is carried out, the routine returns to step 324 shown in the flow chart in FIG. 11.

In a step 324, C", M" and Y" image data, expressing C", M" and Y" images, are converted into R", G" and B" image data expressing R", G" and B" images as a positive image. This conversion is carried out so that the difference (density width) between the maximum density value and the minimum density value in the positive image after conversion, corresponds to the sensitivity difference of the print paper 112.

As described above, the color balance of C", M" and Y" image data is corrected so that the maximum reference values and the minimum reference values of the respective colors are coincident with each other. Accordingly, in an image obtained by overlapping the R", G" and B" images, gray balance is maintained in a region corresponding to the white or near white portion of the subject and in a region corresponding to the black or near black portion of the subject.

Even in the case of an image in which density failure or color failure has occurred, the maximum reference value, the minimum reference value, the average of the C' data with respect to the M' data, and the average of the Y' data with respect to the M' data are not changed. Accordingly, the influence of failure is removed from the C", M" and Y" images and the R", G" and B images. Further, because the gray balance reference in the intermediate density portion is corrected by the curves of secondary degree $P_C$ and $P_Y$, on the basis of the distribution of C', M' and Y' image data on color coordinates, disordering of gray balance in the intermediate density portion is prevented even in the case of an image in which the color of the light source for the intermediate density portion is different from the color of the light source for the maximum density portion.

Further, in step 324, exposure data, expressing the exposure values of R, G and B for the respective pixels, are obtained by exponentially converting the density values of the respective pixels in the R", G" and B" image data. As described above, the light quantity distribution, expressed by the exposure data, is made equal to the distribution of light transmitted through the image so that the quantity of light is uniform, assuming that an ideal image, obtained by overlapping C", M" and Y" images, is recorded on the negative film 12.

Although the above embodiments have been described for the case where CCD line sensors are used in the respective scan portions 36 and 38 of the film image reader 16 for scan-reading an image, the present invention is not limited thereto. For example, as shown in FIG. 21, a CCD area sensor 170, formed by arranging photometric sensors in the shape of a matrix, may be used to simultaneously detect the quantities of light transmitted through respective pixels of the image.

Figure 21:
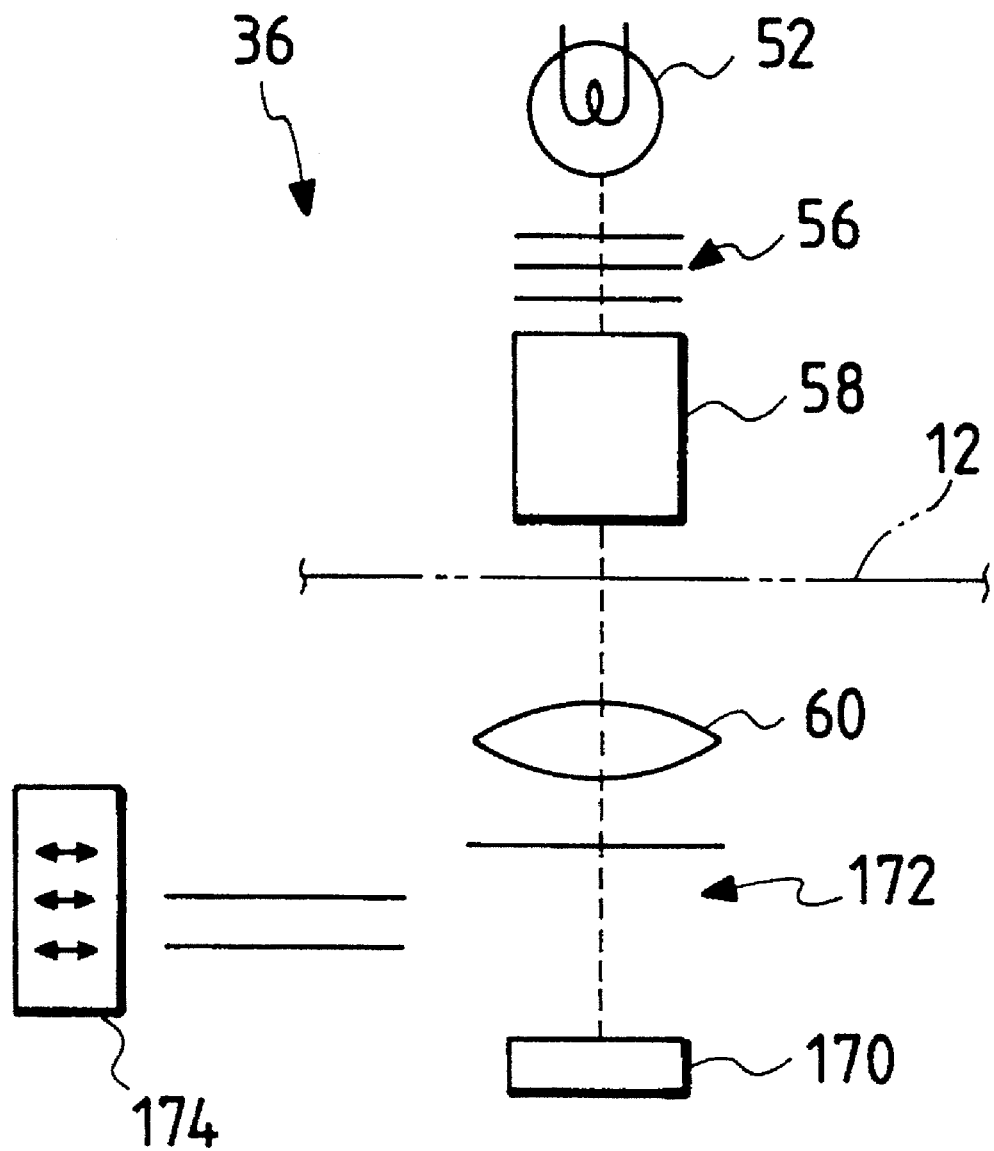
FIG. 21 is a schematic diagram showing another example of the scan portion.

In the pre-scan portion 36, shown in FIG. 21, photometric sensors in the CCD area sensor 170 have sensitivity with respect to the respective wavelengths of R, G and B. A spectral filter group 172, consisting of three spectral filters which are selectively pervious to light of wavelengths R, G and B respectively, is arranged between the image-forming lens 60 and the CCD area sensor 170, so that any one of the spectral filters is inserted in the light path by a filter driver 174 to thereby measure the quantity of transmitted light for each color successively.

If the sensor unit consists of sensors for detecting the quantity of light of R, of sensors for detecting the quantity of light of G and of sensors for detecting the quantity of light of B, since each of the CCD line sensors 62 and 94 is an area sensor having sensors arranged in the shape of a matrix, the spectral filter group 172 and the filter driver 174 can be omitted.

Although the above embodiments have been described for the case where exposure by pixel is determined so that scanning/exposure is applied to each pixel in the printer portion, the present invention is not limited thereto and can be applied to the case where exposure of an image is carried out by surface exposure as widely used in a general printer.

APPENDIX

FIG. 8

Main Routine in Pre-scan Portion

200 Is a negative film inserted?

202 Convey the negative film.

204 Is frame number readable?

206 Does image reach the image detection position?

208 Does image reach the image reading position?

210 Read and store the frame number.

212 Detect the picture position and size.

214 Store the picture position and size corresponding with the frame number.

216 Image scan-reading procedure.

218 Is the film finished?

FIG. 9

Scan/Read Routine in Pre-scan Portion

250 Fetch the density value data for one line.

252 Correct CCD sensitivity variations and store the data into the image buffer.

254 Convey the negative film by a predetermined quantity corresponding to the intervals between the image lines.

256 Is image-reading for one picture complete?

258 Measure and store the density of the base portion.

260 Extract the smallest density value in the picture image.

262 Calculate and store the lamp light quantity for the lamp in the fine-scan portion.

264 Correct base density.

266 Average the density values (to eliminate noise).

268 Perform pigment densities conversion. (R, G, B images→C, M, Y images)

270 Remove the areas in the vicinity of the edges to cut the picture.

272 Divide the picture into a predetermined number of areas.

274 Extract the maximum C, M and Y density values for each divided area.

276 Calculate density values $C_{max}$, $M_{max}$, $Y_{max}$, approximate to the maximum values, by weighted averaging.

278 Calculate the average of $D_{max}$ of $C_{max}$, $M_{max}$ and $Y_{max}$.

280 Calculate the coefficients $A_C$, $A_M$ and $A_Y$ by using $D_{max}$.

282 Generate and store look-up tables for converting C, M and Y densities into C', M' and Y' densities in a range between 0.0–2.0.

284 Convert C, M and Y images into C', M' and Y' images by using the look-up tables (using arithmetical operations for image display).

286 Display a positive image on the display based on the C', M' and Y' images.

FIG. 10

Scan/Read Routine in Pre-scan Portion

250 Fetch the density value data for one line.

252 Correct CCD sensitivity variations and store the data into the image buffer.

254 Convey the negative film by a predetermined quantity corresponding to the intervals between the image lines.

256 Is image-reading for one picture complete?

258 Measure and store the density of the base portion.

260 Extract the smallest density value in the picture image.

262 Calculate and store the lamp light quantity for the lamp in the fine-scan portion.

264 Correct the base density.

266 Average the density values (to eliminate noise).

268 Perform pigment densities conversion. (R, G, B images→C, M, Y images)

270 Remove the areas in the vicinity of the edges to cut the picture.

272 Divide the picture into a predetermined number of areas.

274A Extract the maximum and minimum C, M and Y density values for each divided area.

276A Calculate density values $C_{max}$, $M_{max}$, $Y_{max}$ and $C_{min}$, $M_{min}$, $Y_{min}$, approximate to the maximum and minimum values, by weighted averaging.

278A Calculate the average $D_{max}$ of $C_{max}$, $M_{max}$ and $Y_{max}$ and the average $D_{min}$ of $C_{min}$, $M_{min}$, $Y_{min}$.

280A Calculate the coefficients $A_C$, $A_M$ and $A_Y$ and constants $B_C$, $B_M$ and $B_Y$ by using $D_{max}$ and $D_{min}$.

282A Create and store look-up tables for converting C, M and Y densities into C', M' and Y' densities in a range between 0.0–2.0.

284 Convert C, M and Y images into C', M' and Y' images by using the look-up tables (using the arithmetical operations for image display).

286 Display a positive image on the display based on the C', M' and Y' images.

FIG. 11

Read Routine in Pre-scan Portion

300 Convey the negative film.

302 Does image reach the read position?

304 Fetch the light quantity and control the lamp voltage to a value corresponding to the fetched light quantity.

306 Fetch the density value for the one-pixel-line.

308 Correct CCD sensitivity variations and store the data into the image buffer.

310 Convey the negative film by a predetermined quantity corresponding to the intervals between the image lines.

312 Is image-reading for one picture complete?

314 Correct shading.

316 Correct the base density.

318 Perform pigment densities conversion. (R, G, B images→C, M, Y images)

320 Correct differences between the pre-scan portion and the fine-scan portion.

322 Fetch look-up tables $LuT_C$, $LuT_M$, $LuT_Y$ corresponding to the image.

324 Convert C, M and Y images into C', M' and Y' images by using the look-up tables.

326 Convert the C', M' and Y' images into positive images (=R, G, B exposure quantities for each pixel).

328 Transfer the positive images (exposure quantity data) to the printer portion.

330 Is the film finished?

FIG. 12

Exposure Control Routine in Printer Portion

350 Rotate the polygon mirror.

352 Convey the print paper and position it in the exposure position.

354 Fetch corresponding exposure quantity data.

356 Output data for one line (image exposure for one line).

358 Convey the print paper by a quantity corresponding to one line.

360 Is exposure for one image completed?

362 Is the film finished?

364 Stop the rotation of the polygon mirror.

FIG. 18

Gray Balance Correction Routine

370 Fetch look-up tables $LuT_C$, $LuT_M$, $LuT_Y$ corresponding to the image.

372 Convert C, M and Y images into C', M' and Y' images by using the look-up tables.

374 Plot the C', M' and Y' image data on M'—C' and M'—Y' color coordinates.

376 Form a predetermined region around a line connecting $D_{max}$ and $D_{min}$.

378 Calculate the average density in the predetermined region from the distribution plotted on the M'—C' and M'—Y' coordinates.

380 Deduce a curve of secondary degree that passes through a point corresponding to the average of C, and a curve of secondary degree that passes through a point corresponding to the average of Y.

382 Correct the look-up tables $LuT_C$, $LuT_M$, $LuT_Y$ on the basis of the curves of secondary degree.

384 Convert the C, M and Y images into C", M" and Y" images by using the corrected look-up tables.

What is claimed is:

1. A gray balance correcting method comprising the steps of:

dividing an image recorded on a negative film into a large number of regions and measuring density values of three colors corresponding to pigment density of the film for each region;

determining reference values for the respective colors on the basis of the measured density values;

obtaining conversion correlations such that the reference values of the respective colors, upon conversion, are coincident with each other; and converting the measured density data values of the three colors using the conversion correlations to thereby correct gray balance.

2. A gray balance correcting method according to claim 1, wherein the reference values for the respective colors are comprised of a maximum reference density value.

3. A gray balance correcting method according to claim 2, wherein the conversion correlations are determined so that the converted maximum reference values of the respective colors are made coincident with the average of the measured maximum values of the three colors.

4. A gray balance correcting method according to claim 1, wherein the reference values for the respective colors are comprised of a maximum reference value and a minimum reference value.

5. A gray balance correcting method according to claim 4, wherein the conversion correlations are determined so that the converted maximum reference values of the respective colors are made coincident with the average of the measured maximum values of the three colors, and so that the converted minimum reference values of the respective colors are made coincident with the average of the measured minimum values of the three colors.

6. A gray balance correcting method according to claim 4, further comprising the steps of;

calculating the average of the converted density data in a predetermined region containing a line passing through the converted maximum reference value and the converted minimum reference value on the basis of the distribution, on color coordinates, of the converted density data;

correcting the conversion correlation of the respective colors in accordance with a curve passing through the converted maximum density value, the converted minimum value, and the average of the converted density data; and performing a conversion of the measured density data by using the corrected conversion correlation to correct gray balance.

7. A gray balance correcting method according to claim 1, wherein the division of the image is performed by dividing the image into a multiplicity of pixels so that the area of each of the pixels is set to be less than or equal to 200 $\mu m^2$.

* * * * *